US012634731B2

(12) United States Patent
Patil et al.

(10) Patent No.: US 12,634,731 B2
(45) Date of Patent: May 19, 2026

(54) COORDINATED MEDIUM ACCESS PERIOD MANAGEMENT FOR OVERLAPPING BASIC SERVICE SETS

(71) Applicant: QUALCOMM Incorporated, San Diego, CA (US)

(72) Inventors: Abhishek Pramod Patil, San Diego, CA (US); Abdel Karim Ajami, San Diego, CA (US); Yanjun Sun, San Diego, CA (US); George Cherian, San Diego, CA (US); Alfred Asterjadhi, San Diego, CA (US); Gaurang Naik, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/349,898

(22) Filed: Jul. 10, 2023

(65) Prior Publication Data

US 2025/0024280 A1      Jan. 16, 2025

(51) Int. Cl.
H04W 24/08 (2009.01)
H04W 28/02 (2009.01)
H04W 28/26 (2009.01)

(52) U.S. Cl.
CPC ....... H04W 24/08 (2013.01); H04W 28/0278 (2013.01); H04W 28/26 (2013.01)

(58) Field of Classification Search
CPC ..... H04W 84/12; H04W 88/08; H04W 74/04; H04W 28/0278; H04W 28/26; H04W 24/08
See application file for complete search history.

(56) References Cited

U.S. PATENT DOCUMENTS 11,985,588 B2 * 5/2024 Kim .................. H04W 52/0216
2015/0063327 A1 3/2015 Barriac et al.
(Continued)

FOREIGN PATENT DOCUMENTS

EP          3243292 B1     3/2020
EP          4311361 A2 *   1/2024    ........... H04L 5/0073

OTHER PUBLICATIONS

IEEE: "10.38 DMG and CMMG Channel Access", Revme CL 10 Part2.FM, IEEE—SA, Piscataway, NJ USA, No. D3.0 Apr. 10, 2023, pp. 1-312, XP068200454, Sections 10.40.6.
(Continued)

*Primary Examiner* — Mong-Thuy T Tran
(74) *Attorney, Agent, or Firm* — Holland & Hart LLP

(57)          ABSTRACT
This disclosure provides methods, components, devices and systems for coordinated medium access period management for overlapping basic service sets (OBSSs). Some aspects more specifically relate to coordinated medium access between access points (APs) and stations (STAs) of an OBSS. In some examples, a first STA may monitor, over one or more medium access periods, for communications between a neighbor AP and one or more second STAs. The one or more medium access periods may be configured for medium access and resource reservation for communications between the neighbor AP and the one or more second STAs. In some examples, the first STA may transmit to an associated AP, a report indicating the one or more attributes associated with the monitoring over the one or more medium access periods. In some examples, the report may be solicited or unsolicited, and the STA may monitor for communications over one or more measurement windows.

30 Claims, 9 Drawing Sheets

(56) References Cited

U.S. PATENT DOCUMENTS

| | | | | |
|---|---|---|---|---|
| 2018/0270863 A1 | | 9/2018 | Oteri et al. | |
| 2020/0154240 A1* | | 5/2020 | Edge ..................... | H04W 4/029 |
| 2021/0135792 A1* | | 5/2021 | Cho ...................... | H04L 1/1887 |
| 2023/0216633 A1* | | 7/2023 | Cariou ................... | H04L 5/005 |
| | | | | 370/329 |
| 2023/0422167 A1* | | 12/2023 | Baek ................. | H04W 52/0216 |
| 2024/0080890 A1* | | 3/2024 | Lin ................... | H04W 74/0816 |
| 2024/0236829 A1* | | 7/2024 | Kim ................... | H04W 72/046 |
| 2024/0298312 A1* | | 9/2024 | Xia ................... | H04W 74/0816 |
| 2024/0323834 A1* | | 9/2024 | Cariou ............. | H04W 52/0206 |
| 2024/0334487 A1* | | 10/2024 | Yang ..................... | H04W 74/04 |
| 2024/0357517 A1* | | 10/2024 | Yu ....................... | H04W 52/242 |

OTHER PUBLICATIONS

International Search Report and Written Opinion—PCT/US2024/ 034275—ISA/EPO—Sep. 17, 2024.
Selinis I., et al., "The Race to 5G Era; LTE and Wi-Fi", IEEE Access, vol. 6, Oct. 8, 2018, pp. 56598-56636, XP011693652, abstract.

* cited by examiner

| Communications Monitoring Component | ↔ ↔ | Attribute Determination Component |
| 625 | | 630 |
| Medium Access Reporting Component | ↔ ↔ | Uplink Messaging Component |
| 635 | | 640 |
| Sounding Frame Reception Component | ↔ ↔ | Feedback Messaging Component |
| 645 | | 650 |
| BSRP Reception Component | ↔ ↔ | BSR Component |
| 655 | | 660 |

620

600

Figure 8:
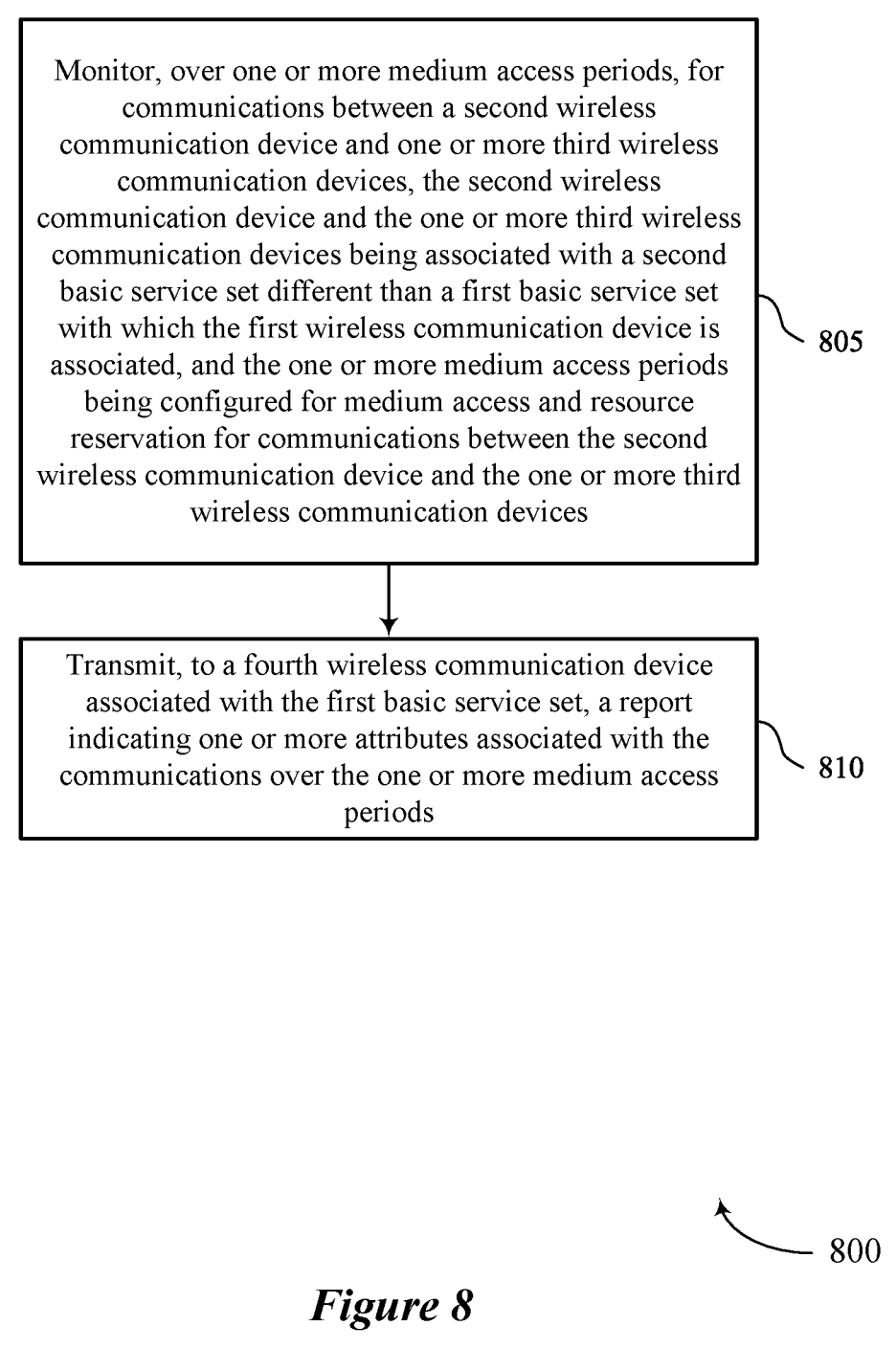

Monitor, over one or more medium access periods, for communications between a second wireless communication device and one or more third wireless communication devices, the second wireless communication device and the one or more third wireless communication devices being associated with a second basic service set different than a first basic service set with which the first wireless communication device is associated, and the one or more medium access periods being configured for medium access and resource reservation for communications between the second wireless communication device and the one or more third wireless communication devices

805

Transmit, to a fourth wireless communication device associated with the first basic service set, a report indicating one or more attributes associated with the communications over the one or more medium access periods

Figure 9:
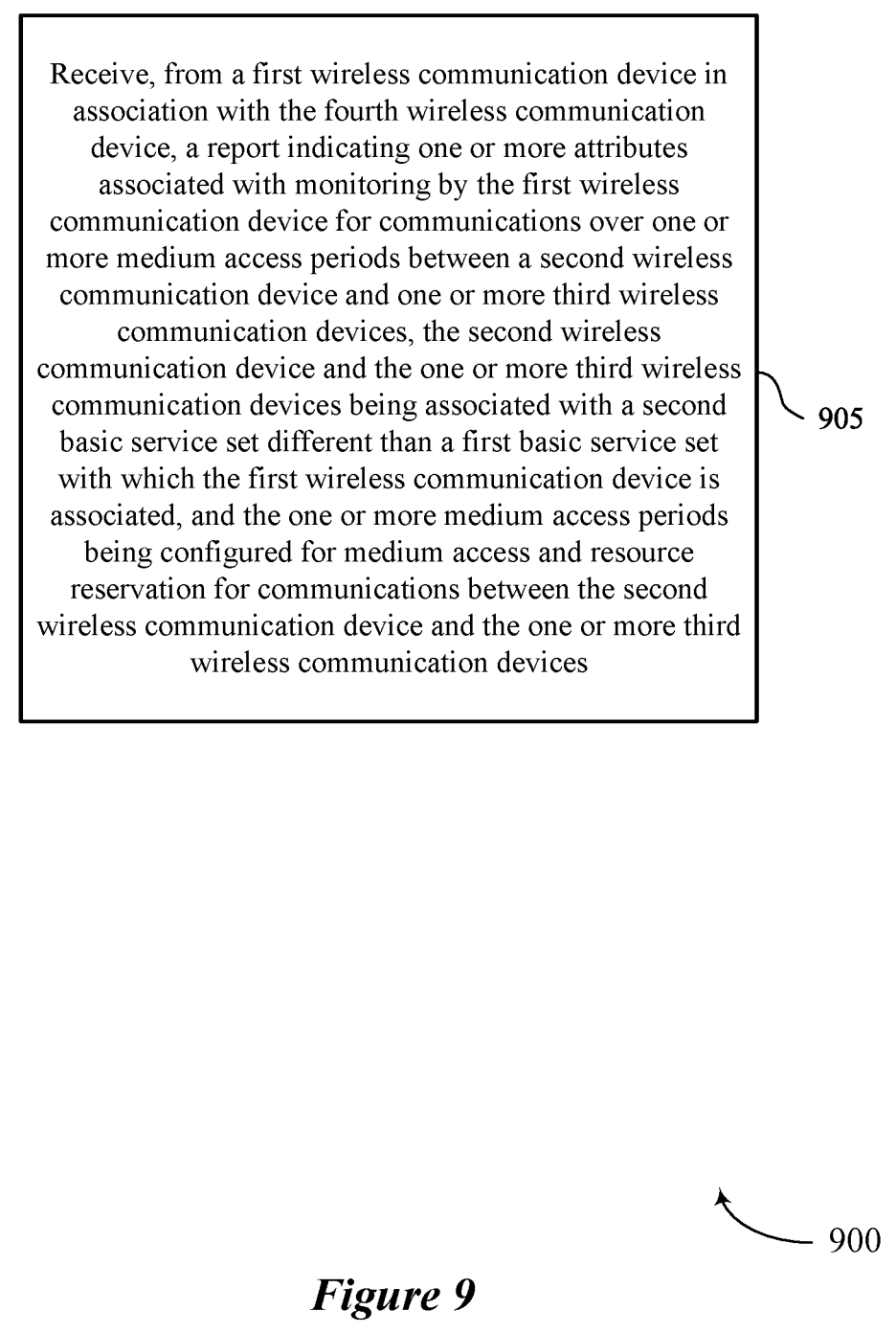

Receive, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second basic service set different than a first basic service set with which the first wireless communication device is associated, and the one or more medium access periods being configured for medium access and resource reservation for communications between the second wireless communication device and the one or more third wireless communication devices

COORDINATED MEDIUM ACCESS PERIOD MANAGEMENT FOR OVERLAPPING BASIC SERVICE SETS

TECHNICAL FIELD

This disclosure relates to wireless communication and, more specifically, to coordinated medium access period management for overlapping basic service sets (OBSSs).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, wireless communication devices may communicate in accordance with medium access periods. For example, a first AP may schedule one or more medium access periods associated with resource reservation mechanisms for communication of latency-sensitive traffic to or from STAs in a first BSS. In such cases, the first AP may include identifiers (IDs) of a configured set of IDs in broadcast elements, in beacon frames, and/or other management frames to differentiate between respective medium access periods in which STAs associated with the first AP may be expected to avoid communicating. Such a configured set of IDs may be indicated via restricted target wake time (TWT) (which may be understood as or referred to as r-TWT, R-TWT, or rTWT) schedule information subfield values, among other examples. Similarly, a second AP associated with a second BSS that neighbors the first BSS may independently schedule medium access periods for STAs in the second BSS, which may overlap one or more of the medium access periods associated with the first BSS.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a first wireless communication device. The method may include monitoring, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices and transmitting, to a fourth wireless communication device associated with the first BSS, a report indicating one or more attributes associated with the communications over the one or more medium access periods.

Another innovative aspect of the subject matter described in this disclosure can be implemented by a first wireless communication device. The first wireless communication device may include a processing system that includes processor circuitry and memory circuitry that stores code. The processing system may be configured to cause the first wireless communication device to monitor, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices and transmit, to a fourth wireless communication device associated with the first BSS, a report indicating one or more attributes associated with the communications over the one or more medium access periods.

Another innovative aspect of the subject matter described in this disclosure can be implemented by a first wireless communication device. The first wireless communication device may include means for monitoring, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices and means for transmitting, to a fourth wireless communication device associated with the first BSS, a report indicating one or more attributes associated with the communications over the one or more medium access periods.

Another innovative aspect of the subject matter described in this disclosure can be implemented in a non-transitory computer-readable medium storing code for wireless communications at a first wireless communication device. The code may include instructions executable by a processor to monitor, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices and transmit, to a fourth wireless communication device associated with the first BSS, a report indicating one or more attributes associated with the communications over the one or more medium access periods.

In some examples of the method, first wireless communication devices, and non-transitory computer-readable medium described herein, the one or more attributes associated with the communications over the one or more medium access periods includes an indication that the first wireless communication device detected an absence of the communications over the one or more medium access periods while monitoring for the communications.

In some examples of the method, first wireless communication devices, and non-transitory computer-readable medium described herein, the report may be unsolicited by the fourth wireless communication device, and the absence of the communications may be indicated for at least one medium access period of the one or more medium access periods.

Some examples of the method, first wireless communication devices, and non-transitory computer-readable medium described herein may further include operations, features, means, or instructions for receiving a request message that indicates at least one medium access period of the one or more medium access periods for measuring the communications between the second wireless communication device and the one or more third wireless communication devices, where the report may be transmitted in response to the request message.

One innovative aspect of the subject matter described in this disclosure can be implemented in a method for wireless communications by a fourth wireless communication device. The method may include receiving, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

Another innovative aspect of the subject matter described in this disclosure can be implemented by a fourth wireless communication device. The fourth wireless communication device may include a processing system that includes processor circuitry and memory circuitry that stores code. The processing system may be configured to cause the fourth wireless communication device to receive, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

Another innovative aspect of the subject matter described in this disclosure can be implemented by a fourth wireless communication device. The fourth wireless communication device may include means for receiving, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

Another innovative aspect of the subject matter described in this disclosure can be implemented in a non-transitory computer-readable medium storing code for wireless communications at a fourth wireless communication device. The code may include instructions executable by a processor to receive, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

In some examples of the method, fourth wireless communication devices, and non-transitory computer-readable medium described herein, the one or more attributes associated with the communications over the one or more medium access periods includes an indication that the first wireless communication device detected an absence of the communications over the one or more medium access periods while monitoring for the communications.

In some examples of the method, fourth wireless communication devices, and non-transitory computer-readable medium described herein, the report may be unsolicited by the fourth wireless communication device, and the absence of the communications may be indicated for at least one medium access period of the one or more medium access periods.

Some examples of the method, fourth wireless communication devices, and non-transitory computer-readable medium described herein may further include operations, features, means, or instructions for transmitting a request message that indicates at least one medium access period of the one or more medium access periods for measuring the communications between the second wireless communication device and the one or more third wireless communication devices, where the report may be received in response to the request message.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 8 and 9 show flowcharts illustrating example processes that support coordinated medium access period management for OBSSs.

Like reference numbers and designations in the various drawings indicate like elements.

DETAILED DESCRIPTION

Figure 1:
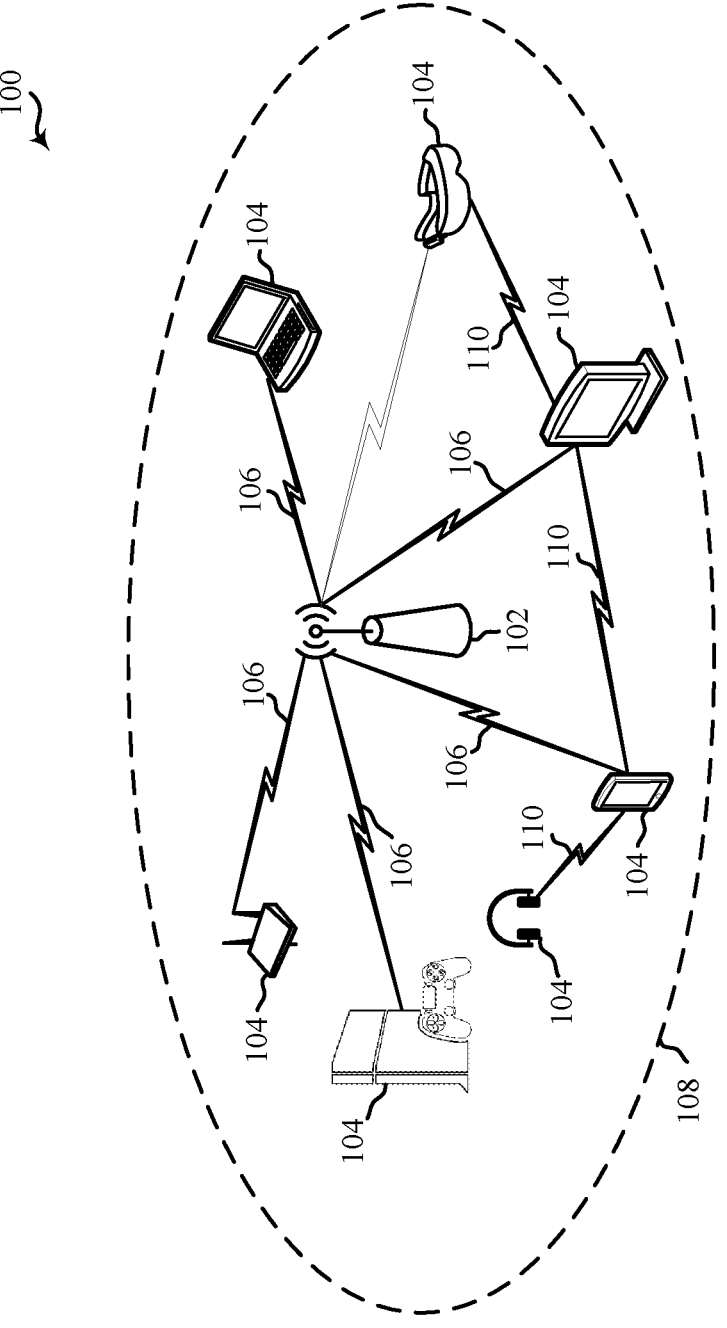
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In some examples of wireless communications, a first access point (AP) may transmit one or more frames (such as one or more management or advertising frames) indicating information pertaining to coordinated medium access. The first AP may further include identifiers (IDs) of a configured set of IDs in broadcast elements, in beacon frames, and/or in other management frames to differentiate between respective medium access periods in which one or more first stations (STAs) associated with the first AP may be expected to avoid communication. Such a configured set of IDs may refer to a restricted target wake time (TWT) (which may be understood as or referred to as r-TWT, R-TWT, or rTWT) scheduling information subfield values, among other examples. The first STAs associated with the first AP may correspond to a first basic service set (BSS), in which the first AP indicates a first set of rTWTs for a least a portion of the first STAs (which may be referred to as member STAs). Similarly, a second AP associated with a second BSS that neighbors the first BSS may independently schedule a second set of rTWTs corresponding to a respective set of IDs. The first AP and the second AP may coordinate rTWTs such that STAs in association with the respective APs refrain from communicating. For example, a STA may defer transmitting during a transmission opportunity (TXOPs) that does not end before an rTWT service period (SP) to respect the rTWTs of neighboring APs. Such mechanisms or aspects for coordinated medium access and coordinated rTWT (c-rTWT) may include advertisement of OBSS rTWT service periods (SPs), in which the STAs of the OBSS refrain from transmission using a TXOP. However, based on one or more characteristics (such as geographic location or transmission power) a given STA may be able to transmit without interfering with one or more OBSS rTWT SPs. As such, OBSS rTWT SPs may, in some examples, overly restrict wireless communications of the OBSS.

Various aspects relate generally to coordinated medium access period management by wireless communication devices. Some aspects more specifically relate to coordinated medium access by STAs for communications between the STAs and/or between the STAs and an associated AP an OBSS, where such coordinated medium access may include various types of and techniques for coordinated medium access as described herein. In some examples, one or more STAs of a given OBSS may monitor one or more medium access periods (such as OBSS rTWT SPs) for communications (such as communications between neighboring APs and/or neighboring STAs). For example, a first STA may monitor the one or more medium access periods for communications and transmit a report to an AP with which the first STA is associated, where the report includes information associated with monitoring the one or more medium access periods. In some examples, the first STA may include information in the report for OBSS rTWT SPs, over which the first STA detected an absence of communications. That is, the first STA may indicate to the servicing AP the OBSS rTWT SPs over which the first STA did not detect communications. In some examples, the first STA may include information in the report for OBSS rTWT SPs over which the first STA detected communications. Additionally, the report may include a respective interference parameter associated with each of the OBSS rTWT SPs that indicates a level of interference (such as a signal strength of communications) detected by the first STA for each of the OBSS rTWT SPs. One or more APs of the OBSS may solicit the report by transmitting a request message to the first STA. In some examples, the first STA may transmit an unsolicited report to the one or more APs of the OBSS. Based on the information included in the report, the servicing AP may determine whether the first STA is able to transmit using a TXOP during the one or more medium access periods without interfering with the c-rTWT of the OBSS. In some examples, each AP of the OBSS may indicate to the STAs of the OBSS a respective measurement window for one or more OBSS rTWT SPs over which the STAs of the OBSS may monitor and perform measurements for respective reports. The report may include information for all non-interfering OBSS rTWT SPs and/or information for all OBSS rTWTs for which communications are detected.

Particular aspects of the subject matter described in this disclosure can be implemented to realize one or more of the following potential advantages. In some examples, by enabling and further defining mechanisms associated with coordinated medium access period management, various wireless communication devices within a system may achieve relatively more efficient medium utilization. For example, coordinated medium access period management may enable one or more STAs to transmit uplink messages over medium access periods (such as OBSS rTWT SPs) without interfering with other communications for the medium access periods. Further, by using respective measurement windows for measuring the one or more medium access periods, the STAs of the OBSS may generate and transmit respective reports including the information for the one or more medium access periods in a timely manner without causing system ambiguity. Further, one or more STAs may determine to communicate with one or more other non-AP STAs (via peer-to-peer (P2P) communication) over OBSS rTWT SPs that the one or more STAs would otherwise be restricted from communicating over. As such, the described techniques may be implemented to realize greater throughput, higher data rates, greater coordination, greater spectral efficiency, and improved user experience, among other benefits as described herein.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown with reference to FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to
a wired or wireless distribution system that may enable
multiple APs 102 to be connected in such an ESS. As such,
a STA 104 can be covered by more than one AP 102 and can
associate with different APs 102 at different times for
different transmissions. Additionally, after association with
an AP 102, a STA 104 also may periodically scan its
surroundings to find a more suitable AP 102 with which to
associate. For example, a STA 104 that is moving relative to
its associated AP 102 may perform a "roaming" scan to find
another AP 102 having more desirable network character-
istics such as a greater received signal strength indicator
(RSSI) or a reduced traffic load.

In some examples, STAs 104 may form networks without
APs 102 or other equipment other than the STAs 104
themselves. One example of such a network is an ad hoc
network (or wireless ad hoc network). Ad hoc networks may
alternatively be referred to as mesh networks or peer-to-peer
(P2P) networks. In some examples, ad hoc networks may be
implemented within a larger network such as the wireless
communication network 100. In such examples, while the
STAs 104 may be capable of communicating with each other
through the AP 102 using communication links 106, STAs
104 also can communicate directly with each other via direct
wireless communication links 110. Additionally, two STAs
104 may communicate via a direct wireless communication
link 110 regardless of whether both STAs 104 are associated
with and served by the same AP 102. In such an ad hoc
system, one or more of the STAs 104 may assume the role
filled by the AP 102 in a BSS. Such a STA 104 may be
referred to as a group owner (GO) and may coordinate
transmissions within the ad hoc network. Examples of direct
wireless communication links 110 include Wi-Fi Direct
connections, connections established by using a Wi-Fi Tun-
neled Direct Link Setup (TDLS) link, and other P2P group
connections.

Some APs and STAs (for example, the AP 102 and the
STAs 104) may implement spatial reuse techniques. For
example, APs 102 and STAs 104 configured for communi-
cations using the protocols defined in the IEEE 802.11ax or
802.11be standard amendments may be configured with a
BSS color. APs 102 associated with different BSSs may be
associated with different BSS colors. A BSS color is a
numerical identifier of an AP 102's respective BSS (such as
a 6 bit field carried by the SIG field). Each STA 104 may
learn its own BSS color upon association with the respective
AP 102. BSS color information is communicated at both the
PHY and MAC sublayers. If an AP 102 or a STA 104 detects,
obtains, selects, or identifies, a wireless packet from another
wireless communication device while contending for access,
the AP 102 or STA 104 may apply different contention
parameters in accordance with whether the wireless packet
is transmitted by, or transmitted to, another wireless com-
munication device (such another AP 102 or STA 104) within
its BSS or from a wireless communication device from an
overlapping BSS (OBSS), as determined, identified, ascer-
tained, or calculated by a BSS color indication in a preamble
of the wireless packet. For example, if the BSS color
associated with the wireless packet is the same as the BSS
color of the AP 102 or STA 104, the AP 102 or STA 104 may
use a first RSSI detection threshold when performing a CCA
on the wireless channel. However, if the BSS color associ-
ated with the wireless packet is different than the BSS color
of the AP 102 or STA 104, the AP 102 or STA 104 may use
a second RSSI detection threshold in lieu of using the first
RSSI detection threshold when performing the CCA on the
wireless channel, the second RSSI detection threshold being greater than the first RSSI detection threshold. In this way,
the criteria for winning contention are relaxed when inter-
fering transmissions are associated with an OBSS.

Some APs and STAs (for example, the AP 102 and the
STAs 104) may implement techniques for spatial reuse that
involve participation in a coordinated communication
scheme. According to such techniques, an AP 102 may
contend for access to a wireless medium to obtain control of
the medium for a TXOP. The AP that wins the contention
(hereinafter also referred to as a "sharing AP") may select
one or more other APs (hereinafter also referred to as
"shared APs") to share resources of the TXOP. The sharing
and shared APs may be located in proximity to one another
such that at least some of their wireless coverage areas at
least partially overlap. Some examples may specifically
involve coordinated AP TDMA or OFDMA techniques for
sharing the time or frequency resources of a TXOP. To share
its time or frequency resources, the sharing AP may partition
the TXOP into multiple time segments or frequency seg-
ments each including respective time or frequency resources
representing a portion of the TXOP. The sharing AP may
allocate the time or frequency segments to itself or to one or
more of the shared APs. For example, each shared AP may
utilize a partial TXOP assigned by the sharing AP for its
uplink or downlink communications with its associated
STAs.

In some examples of such TDMA techniques, each por-
tion of a plurality of portions of the TXOP includes a set of
time resources that do not overlap with any time resources
of any other portion of the plurality of portions of the TXOP.
In such examples, the scheduling information may include
an indication of time resources, of multiple time resources of
the TXOP, associated with each portion of the TXOP. For
example, the scheduling information may include an indi-
cation of a time segment of the TXOP such as an indication
of one or more slots or sets of symbol periods associated
with each portion of the TXOP such as for multi-user
TDMA.

In some examples of OFDMA techniques, each portion of
the plurality of portions of the TXOP includes a set of
frequency resources that do not overlap with any frequency
resources of any other portion of the plurality of portions. In
such examples, the scheduling information may include an
indication of frequency resources, of multiple frequency
resources of the TXOP, associated with each portion of the
TXOP. For example, the scheduling information may
include an indication of a bandwidth portion of the wireless
channel such as an indication of one or more subchannels or
resource units associated with each portion of the TXOP
such as for multi-user OFDMA.

In this manner, the sharing AP's acquisition of the TXOP
enables communication between one or more additional
shared APs and their respective BSSs, subject to appropriate
power control and link adaptation. For example, the sharing
AP may limit the transmit powers of the selected shared APs
such that interference from the selected APs does not
prevent STAs associated with the TXOP owner from suc-
cessfully decoding packets transmitted by the sharing AP.
Such techniques may be used to reduce latency because the
other APs may not need to wait to win contention for a
TXOP to be able to transmit and receive data according to
conventional CSMA/CA or enhanced distributed channel
access (EDCA) techniques. Additionally, by enabling a
group of APs 102 associated with different BSSs to partici-
pate in a coordinated AP transmission session, during which
the group of APs may share at least a portion of a single
TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some examples, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Some aspects more specifically relate to coordinated medium access between APs 102 and STAs 104 of an OBSS, where such coordinated medium access may include various types of and techniques for coordinated medium access as described herein. In some examples, one or more STAs 104 of a given OBSS may monitor one or more medium access periods (such as OBSS rTWT SPs) in an attempt to detect and/or measure communications between other wireless communication devices. For example, a first STA 104 may monitor the one or more medium access periods for communications and transmit a report to an AP 102 servicing the first STA 104, where the report includes information associated with monitoring the one or more medium access periods.

In some examples, the first STA 104 may include information in the report for OBSS rTWT SPs over which communications were not detected by the first STA 104. That is, the first STA 104 may indicate to the servicing AP 102 over which OBSS rTWT SPs the first STA 104 did not intercept communications to or from other wireless communication devices. In some examples, the first STA 104 may include information in the report for OBSS rTWT SPs over which the first STA 104 detected communications. Additionally, the report may include a respective interference parameter associated with each of the OBSS rTWT SPs that indicates a level of interference detected by the first STA 104 for each of the OBSS rTWT SPs. In some examples, one or more APs 102 of the OBSS may solicit the report by transmitting a request message to the first STA 104. In some examples, the first STA 104 may transmit an unsolicited report to the one or more APs 102 of the OBSS.

Using the information included in the report, the servicing AP 102 may determine whether the first STA 104 is able to transmit using a TXOP during the one or more medium access periods without interfering with the c-rTWT of the OBSS. In some examples, each AP 102 of the OBSS may indicate to the STAs 104 of the OBSS a respective measurement window for one or more OBSS rTWT SPs over which the STAs 104 of the OBSS may monitor and perform measurements for respective reports. In some examples, the report may include information for all non-interfering OBSS rTWT SPs and/or information for all OBSS rTWTs in which communications is detected.

Figure 2:
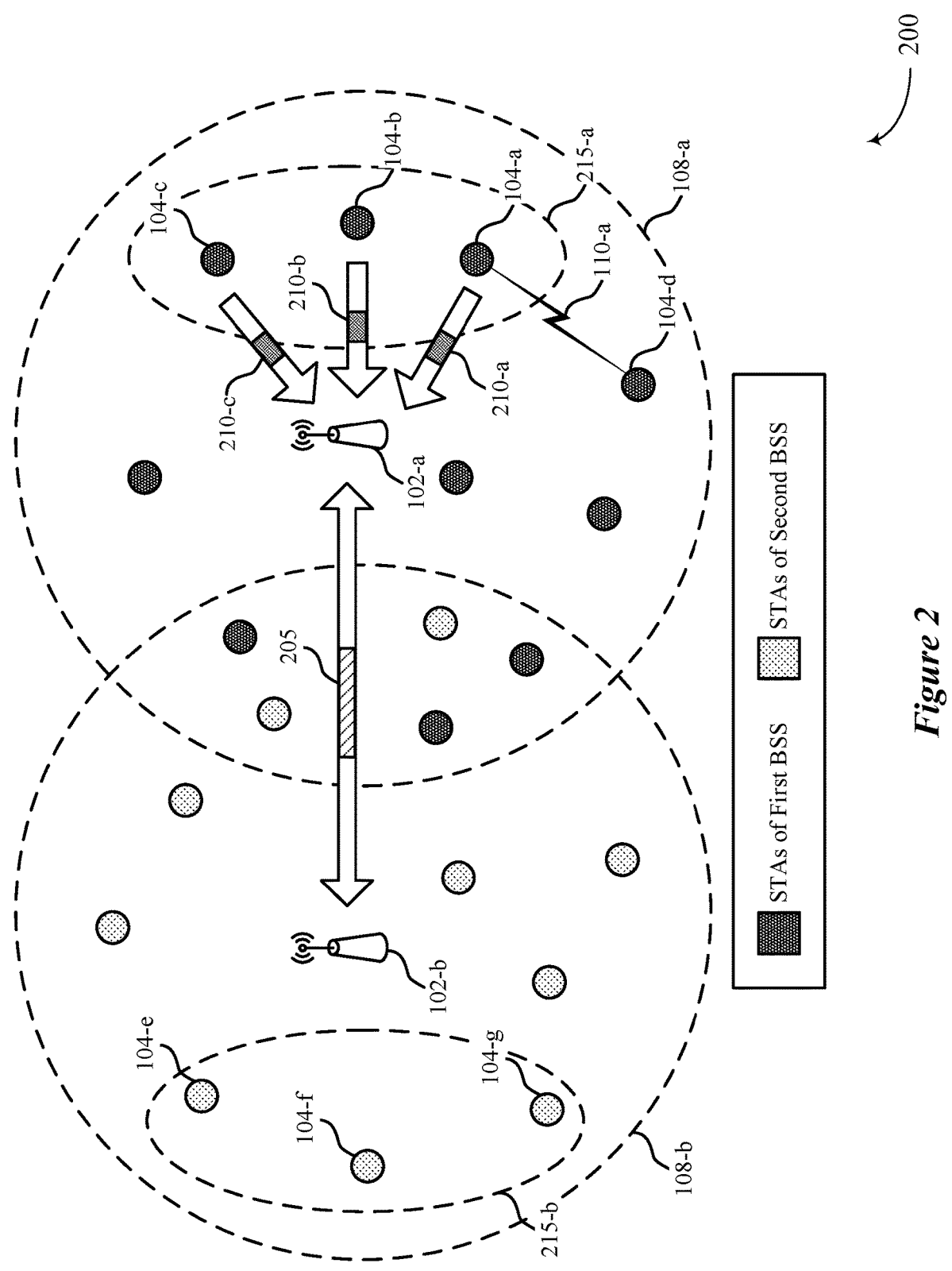
FIG. 2 shows an example of a wireless communication network that supports coordinated medium access period management for overlapping basic service sets (OBSSs).

FIG. 2 shows an example of a wireless communication network 200 that supports coordinated medium access period management for OBSSs. The wireless communication network 200 may implement or be implemented to realize aspects of the wireless communication network 100. For example, the wireless communication network 200 illustrates communication between various wireless communication devices, including AP 102-a and AP 102-b, in which AP 102-a is associated with a first coverage area 108-a, which corresponds to a first BSS, and the AP 102-b is associated with a second coverage area 108-b, which corresponds to a second BSS. With reference to FIG. 2, the AP 102-a may support and communicate with one or more STAs 104 of the first BSS and the AP 102-b may support and communicate with one or more STAs 104 of the second BSS. As described herein, any such APs or STAs may be referred to or understood as a wireless communication device.

In some systems, such as in ultra-high reliability (UHR) systems, wireless communication devices may support one or more of several aspects or features involving medium access coordination amongst APs 102 and STAs 104, including amongst APs 102 and STAs 104 belonging to different BSSs. Such medium access coordination may include coordinated TDMA (C-TDMA), coordinated scheduling request (C-SR), or coordinated OFDMA (C-OFDMA) between neighboring APs 102, TWT (such as rTWT) coordination between neighboring OBSSs, or multi-primary channel access techniques, among other examples.

In some aspects, wireless communication devices may employ an rTWT framework to aid low-latency flows (such as to prioritize low-latency flows over non-low-latency flows). In such aspects, the wireless communication devices (such as any combination of APs 102 and STAs 104) may negotiate timing aspects related to rTWT, including time epochs or SPs associated with rTWT. In some examples, rTWT may be a variant of broadcast TWT (bTWT). During an rTWT, in-BSS STAs 104 (that support rTWT) may terminate (such as in accordance with a system expectation or constraint) a TXOP before a start of an rTWT SP. Additionally, or alternatively, one or more wireless communication devices may restart one or more counters associated with channel access (contention) at a beginning of an rTWT SP.

UHR-capable devices may leverage or extend some coordinated access mechanisms to enable some of the such medium access coordination. For example, one or more wireless communication devices may use a multi-user (MU)-request to send (RTS) TXOP sharing (TXS) framework or rTWT coordination between collocated APs 102 (APs 102 in a multiple BSSID set, such as the AP 102-a and the AP 102-b). Further, some wireless communication devices may support one or more rules for coordinating rTWT amongst APs 102 belonging to a multiple BSSID set. For example, some wireless communication devices may support or define (such as in accordance with a standard or network configuration) a particular value (such as 3) included in a subfield to indicate a schedule (such as an rTWT SP schedule) for another AP 102 in the set. Such a value may be carried in a schedule information subfield, such as a Restricted TWT Schedule Info (RTSI) subfield, of a TWT information element (IE). As described herein, an RTSI subfield may be an example of a schedule information subfield, and may be included in any field or subfield of any frame, such as a management frame (such as a beacon frame or a probe response frame, among other examples). The AP 102-a and the AP 102-b may include such communication regarding rTWT coordination in coordinated medium access period signaling 205.

The coordinated medium access period signaling 205 may provide various mechanisms or aspects related to AP-to-AP coordination, including coordinated medium access (which may be referred to as CMA) amongst (such as between) neighboring APs 102 (via, using, or otherwise in accordance with rTWT). Such mechanisms or aspects for coordinated medium access and c-rTWT may include advertisement of OBSS schedules to in-BSS STAs 104, channel access within SPs, group formation, signaling amongst APs 102, mechanisms associated with critical updates, aspects and mechanisms associated with beacon offloading, and the like. The wireless communication devices of wireless communication network 200 may operate in accordance with the mechanisms of c-rTWT. For example, the APs 102 may determine one or more medium access periods that correspond to the OBSS. In some examples, such medium access periods may be examples of (or otherwise relate to) OBSS rTWT SPs. Medium access period, however, may relate to other periods that are associated with enhanced medium access resource reservation and protection for latency-sensitive traffic in the wireless communication network 200. STAs 104 of the OBSS (such as STAs 104 of the both the first and second BSSs) that support rTWT may refrain from performing TXOP and deprioritize associated channel access over the OBSS rTWT SPs.

In some examples, mechanisms of c-rTWT support an increase in system throughput for asynchronous transmissions occurring across the multiple BSSs of the OBSS. For instance, a given OBSS rTWT SP may be associated with an rTWT for the AP 102-*b*, in which the AP 102-*b* may communicate low latency data with one or more wireless communication devices (such as one or more designated STAs 104 of the second BSS). As such, STAs 104 of the first BSS may refrain from transmitting using a TXOP over the rTWT SP for the AP 102-*b* to reduce interference and tail latencies of the low latency communications. In some examples, however, one or more STAs 104 of the first BSS may communicate during the rTWT SP without interfering with transmissions for the AP 102-*b*. For instance, a STA 104-*a*, a STA 104-*b*, and a STA 104-*c* may be located within a geographic coverage area 215-*a* of the first BSS such that at least some communications with one or more of the STAs 104 within the geographic coverage area 215-*a* are unlikely to interfere with communications of the AP 102-*b* occurring in the second BSS. Reciprocally, a STA 104-*e*, a STA 104-*f*, and a STA 104-*g* may reside within a geographic coverage area 215-*b* of the second BSS such that at least some communications with one or more of the STAs 104 within the geographic coverage area 215-*b* are unlikely to interfere with communications of the AP 102-*a* occurring in the first BSS. Additionally, or alternatively, one or more STAs 104 of the OBSS may communicate at a transmission power level such that it is unlikely to interfere with dedicate communications occurring over one or more OBSS rTWT SPs. As such, coordination of medium access periods between multiple APs 102 of an OBSS may be underspecified and/or fail to provide definiteness or general applicability to various types of scenarios that will be desired in systems featuring greater throughput capacity, denser deployments, more efficient and lower latency medium access, and the like. That is, additional flexibility for medium access techniques may be desirable to enable improved system performance, throughput, and reliability for all wireless communication devices in the wireless communication network 200.

In some examples of the present disclosure, various wireless communication devices may support one or more configuration or signaling-based mechanisms according to which such wireless communication devices may address various aspects related to medium access coordination. More specifically, aspects of the present disclosure provide several options or several different mechanisms, which may be leveraged independently or in a combined manner, for coordinated medium access (including coordinating rTWTs) amongst APs 102 (and their associated STAs 104) belonging to a multiple BSSID set and a co-hosted BSSID set.

In some examples, each AP 102 of the OBSS may designate a portion of at least one OBSS rTWT SP belonging to an rTWT schedule for the STAs 104 belonging to neighboring APs 102 to perform measurements. For instance, the STA 104-*a* may receive an indication of a respective measurement window corresponding to one or more medium access periods (such as rTWT SPs) associated with the AP 102-*b* over which the STA 104-*a* may monitor for communications. Each AP 102 may have one or more rTWT schedules where each of the one or more rTWT schedules may have a different STA 104 membership and/or traffic priority. Each AP 102 may designate a measurement window (which may be referred to as a measurement duration) for each of the associated rTWT schedules, such that each measurement window may be associated with a respective duration for the STAs 104 to monitor and perform measurements. A measurement window may include some duration of time in which measurements may be performed. In some examples, such as when an rTWT is established for latency-sensitive traffic, the measurement window may be configured by the AP 102-*a* for one or more of the STAs 104 that are associated with the AP 102-*a*, where the measurement window corresponds to one or more rTWT SPs for the AP 102-*b*. That is, the AP 102-*a* may configure and indicate one or more measurement windows for another AP's rTWT, and the one or more measurement windows may be configured based on a priority level or a latency-sensitivity for traffic associated with the rTWT of the other AP 102. In such examples, the AP 102-*a* may determine which (if any) wireless communication devices interfere with such traffic types by exchanging signaling with the wireless communication devices associated with the AP 102-*a*. Additionally, or alternatively, for rTWTs that are established for some types of traffic that have relatively lower priority, or traffic having some periodicity (such as aperiodic traffic), among other examples, the AP 102 that schedules the rTWT (such as AP 102-*b*) may configure the one or more measurement windows for rTWT SPs, thereby enabling other APs 102 to determine which (if any) wireless communication devices interfere with the traffic corresponding to the rTWT. In some examples, each AP 102 may indicate one or more rTWT schedules (such as critical rTWT schedules) for which measurements by STAs 104 may be prohibited. For instance, there may be some rTWTs associated with relatively high-priority traffic that precludes measurements from being performed over one or more rTWT SPs of the corresponding rTWTs.

To account for mobility and power-save states of the STAs 104, each AP 102 may indicate a periodicity associated with each of the respective measurement windows. For instance, an AP 102 may indicate that a measurement window occurs at periodic intervals (such as every fifth SP of an rTWT schedule). In some examples, the STAs 104 receive the indications of the one or more measurement windows from one or more neighboring APs 102. For instance, the STA 104-*a* may receive the indication of the one or more measurement windows from the AP 102-*b*. Additionally, or alternatively, the STAs 104 may receive the indications of the one or more measurement windows from their current serving AP 102. For instance, the STA 104-*a* may receive the indication of the measurement windows from the AP 102-*a*.

In some examples, one or more of the APs 102 of the OBSSs may exchange sounding frames with one or more of the STAs 104 that are members of a given rTWT schedule over the measurement window associated with the given rTWT schedule. In one example, the AP 102-*a* may request for one or more of the STAs 104 of the first BSS (such as the STA 104-*a*, the STA 104-*b*, and the STA 104-*c*) monitor a set of measurement windows that are associated with one or more rTWT schedules corresponding to the AP 102-*b* and the second BSS. For instance, over each of the set of measurement windows, an AP 102 (such as the AP 102-*a* or the AP 102-*b*) may transmit a respective sounding frame to one or more STAs 104 of the second BSS. In accordance with receiving the respective sounding frame for each of the set of measurement windows, the STAs 104 of the second BSS may transmit a response to each respective sounding frame. Concurrent to the exchange of sounding frames and sounding frame responses, the one or more STAs 104 of the first BSS may monitor for interference over each respective measurement window. As such, the requested STAs 104 of the first BSS may determine information associated with interference for each if the one or more rTWT schedules corresponding to the AP 102-*b* and the second BSS. In some examples, the STAs 104 exchanging signaling with an AP 102 for measurements over one or more medium access periods may be a subset of the STAs 104 associated with that AP 102, where the subset may be determined or selected based on one or more conditions associated with the respective STAs 104 in the subset (such as a location, a proximity to the AP 102, mobility of the STA 104, or the like). In some examples, the STAs 104 of the first BSS may transmit respective reports 210 to the AP 102-*a* that indicate the determined information associated with the interference. For instance, the STA 104-*a* may transmit a report 210-*a*, the STA 104-*b* may transmit a report 210-*b*, and the STA 104-*c* may transmit a report 210-*c* to the AP 102-*a*. Reciprocally, over rTWT schedules corresponding to the AP 102-*a* and the first BSS, one or more STAs of the first BSS may exchange sounding frames and sounding frame responses while one or more STAs of the second BSS monitor for interference associated with rTWT schedules corresponding to the AP 102-*a* and the first BSS.

In some examples, instead of transmitting sounding frames, the APs 102 may perform a triggering operation. For example, an AP 102 (such as the AP 102-*a* or the AP 102-*b*) may transmit a buffer status report poll (BSRP) trigger over each respective measurement window to the STAs 104 that are members of the associated rTWT schedules. As such, the STAs 104 may transmit respective buffer status reports (BSRs). In some examples, the BSRP and/or the respective BSRs may include one or more transmission parameters (such as transmission power). The APs 102 may use the one or more transmission parameters to determine an associated pathloss.

In some examples, each AP 102 associated with the OBSS may transmit an indication (to the STAs 104 associated with the AP 102) of when to expect the measurement windows. In some examples, the indication of the measurement windows may be carried in a broadcast frame, such as a beacon frame. In some examples, an AP 102 may transmit the indication of the measurement windows to a subset of STAs 104 (via a one-to-one unicast transmission). In some examples, an AP 102 may indicate the measurement windows associated with the AP 102 in a broadcast frame to all STAs 104 within the OBSS.

In some examples, a STA 104 may indicate (via the report 210) to an associated AP 102, absence of communications detected over one or more OBSS rTWT schedules. Such a report 210 may be unsolicited or solicited by an AP 102. An unsolicited report 210 may include information for all non-interfering OBSS rTWTs. That is, the unsolicited report may indicate that no communications were detected when monitoring a quantity of OBSS rTWT SPs, where the report indicates all OBSS rTWTs for which no communications were detected. In examples of a solicited report 210, the associated AP 102 may transmit a request to one or more STAs 104 indicating at least one OBSS rTWT to monitor, in which the request includes a BSSID, or a BSS color associated with the at least one OBSS rTWT. That is, an AP 102 may specify which OBSS rTWTs for which measurement results are requested. In some examples, the associated AP 102 may request a report 210 for interference associated with all OBSS rTWTs. In some examples, the associated AP 102 may determine to request the report 210 from a given STA 104 in accordance with a geographic location of the given STA 104 with reference to the OBSS. For instance, the AP 102-*a* may use techniques (such as one or more machine learning algorithms) to determine to request the report 210 from any STAs 104 within geographic coverage area 215-*a*. In some examples, the associated AP 102 may transmit the request in a solicitation via one or more unicast transmissions to one or more STAs 104 or a group addressed message that indicates one or more STAs 104. In some examples, the associated AP 102 may refrain from indicating when the STAs 104 may monitor and perform measurements for the OBSS rTWTs. In such examples, the STAs 104 may determine to perform measurements for the OBSS rTWTs at durations not limited by OBSS SPs.

In some examples, a STA 104 may indicate (via the report 210) to an associated AP 102, OBSS rTWT SPs over which the STA 104 detected communications (or interference). Such a report 210 may indicate a range of received signal strength indicators (RSSIs) the STA 104 identified for transmissions within an associated OBSS rTWT SP. The STA 104 may identify the associated OBSS rTWT SP in the report 210 based on indicating an associated BSS color or BSSID (MAC address). In accordance with receiving the report 210, the associated AP 102 may determine (via reciprocity) if the STA 104 is likely to interfere with the OBSS rTWT if the STA 104 were to transmit over the OBSS rTWT. As such, by receiving respective reports 210 from multiple STAs 104, the AP 102 may identify which associated STAs 104 may perform uplink over one or more OBSS rTWTs without causing interference with neighboring wireless communication devices. In some examples of an unsolicited report 210, an rTWT of an OBSS may be visible to the reporting STA 104 and may not be visible to the associated AP 102, and the AP 102 may use such information regarding rTWT visibility for scheduling the STA 104 for downlink or uplink.

An AP 102 may request for an associated STA 104 to monitor for interference for one or more OBSS rTWT SPs and the associated STA 104 may transmit the report 210 that includes information associated with the monitoring by using one or more signaling frameworks. In some examples, an event request and event report framework may be used for exchanging messages between a STA 104 and AP 102, where such messages are associated with monitoring for and/or measuring communications over the one or more medium access periods, such as at least the transmission of the report 210 from a STA 104 to an AP 102. In some examples, one or more new reporting types, techniques, and/or signaling frameworks may be used for signaling the information included in the report 210 and/or for polling and corresponding responses (such as for measurements performed by a wireless communication device). The report 210 may include a mechanism to identify one or more OBSS rTWT schedules (such as including OBSS BSSID or OBSS rTWT parameter set).

In some examples, an AP 102 may signal a request and a STA 104 may signal the report 210 using fields in the MAC or the PHY header (such as A-Control field in the MAC header). In some examples, a duration between multiple instances of an AP 102 request and the report 210 from a STA 104 may be in accordance with a mobility of wireless communication devices associated with the OBSS. That is, in some examples, an AP 102 and/or STA 104 may exchange signaling associated with measurements over one or more medium access periods relatively frequently to account for mobility and other dynamic factors. In some examples, the request from and AP 102 and the report 210 from a STA 104 may include information identifying the OBSS (via BSSID or BSS color) and/or include information associated with a respective duration and periodicity of measurement for one or more OBSS rTWT SPs.

In some examples, an AP 102 may setup a trigger enabled TWT that may overlap with one or more OBSS rTWT SPs to manage STA uplink transmissions over one or more OBSS rTWTs. As such, the AP 102 may control one or more characteristics for communications at a STA 104 such as an uplink duration, an uplink bandwidth, or an uplink transmission power. In some examples, the AP 102 may set up the trigger in scenarios in which a STA 104 identifies OBSS transmissions below an RSSI threshold. In some examples, the triggered enabled TWT may be associated with a single STA 104 (an individual TWT (iTWT)) or associated with multiple STAs 104 (a bTWT for a group of STAs 104). In some examples, the AP 102 may indicate (via a one-to-one frame exchange or advertisement) a transmission power and/or power spectral density (PSD) that one or more STAs 104 may use for non-triggered uplink transmissions over an overlapping rTWT SP. If the AP 102 indicates multiple STAs 104 that may transmit over an overlapping rTWT SP (via a group addressed transmission), the AP 102 may include a mechanism in the indication (such as an attention identifier (AID) list) to identify the STAs 104 that are allowed to transmit over the overlapping OBSS rTWT SP.

One or more STAs 104 may determine to communicate via P2P. For example, the STA 104-a may communicate with a STA 104-d via a direct wireless communication link 110-a (which may be referred to as a P2P link or a P2P communication link). In some examples, one or more direct wireless communication links 110-a may be considered an OBSS to a link between a STA 104 and an AP 102, even in examples when a same wireless communication device is associated with both links. In examples where such a wireless communication device having both types of links is a STA 104, the STA 104 will have one interface (such as a STA instance) operating on link between the STA 104 and the AP 102, as well as a different STA instance for communications via the direct wireless communication link 110-a.

In some examples, the STAs 104 may determine to communicate via P2P over one or more OBSS rTWT SPs. For example, the STA 104-a and the STA 104-d may exchange signaling to determine which slots (such as over which OBSS rTWT SPs) to communicate via P2P. That is, the STA 104-a and the STA 104-d may exchange control signaling to converge on slots over which a level of interference for an OBSS rTWT is below an interference threshold. In some examples, an associated AP 102 of a STA 104 may schedule a P2P TWT for the STA 104 on an off-channel that aligns with an OBSS rTWT SP in accordance with the report 210. For instance, if the report 210-a from STA 104-a indicates to the AP 102-a that an associated interference of one or more OBSS rTWT SPs (such as RSSI level) is below a threshold, the AP 102-a may schedule the STA 104-a for a P2P TWT that may overlap with the one or more OBSS rTWT SPs. That is, a STA 104 and an associated AP may negotiate an off-channel P2P TWT over durations that the STA 104 and the associated AP 102 may refrain from communicating in accordance with one or more OBSS rTWTs.

In some examples, one or more rules may be defined that enable a relaxation of TXOP termination processes by a STA 104 before a start of an OBSSs rTWT SP. Such rules may be based on reports 210 provided by one or more STAs 104 indicating that transmission by such STAs 104 may not cause interference or cause interference that satisfies a threshold interference level for OBSS transmission. For instance, the AP 102-a may receive reports 210 from one or more STAs 104 that indicate one or more attributes related to communications detected by the one or more STAs 104. Such attributes may then be used to determine, based on one or more rules, that early termination of TXOPs may be relaxed for at least some of the STAs 104 that indicated the attributes.

In some examples, an AP 102 may determine one or more associated STAs 104 that may communicate over one or more OBSS rTWT SPs. For instance, the AP 102-a may receive the report 210-a (that may be solicited or unsolicited) from the STA 104-a that indicates a respective level of interference associated with one or more OBSS rTWT SPs. As such, if for a given OBSS rTWT SP, the report 210-a indicates no interference or a value of interference (such as RSSI) below a threshold, the AP 102-a may indicate that the STA 104-a may refrain from termination of TXOP before the start of the given OBSS rTWT SP.

In some examples, an AP 102 may determine to request (solicit) the report 210 from a given STA 104 in accordance with a mobility associated with the given STA 104. For instance, the AP 102-a may transmit a request to the STA 104-a to transmit the report 210-a if an associated mobility of the STA 104-a is above a first threshold (in which the STA 104-a may be moving relatively quickly) or is below a second threshold (in which the STA 104-a may be staying relatively stationary). The APs 102 may determine a respective mobility parameter (such as velocity or acceleration) associated with each corresponding STA 104 of the OBSS by using one or more techniques (such as one or more machine learning algorithms).

In some examples, an AP 102 may indicate a duration in which an allotted STA 104 may perform uplink transmissions over OBSS SPs. For instance, the AP 102 may indicate to the STA 104 to perform check-in with the AP 102 after the indicated duration (such as transmit a subsequent report 210). The AP 102 may use the check-in to determine if the STA 104 may continue performing uplink transmissions over OBSS SPs for another duration. The AP may use such a check-in procedure to accommodate for mobility of non-AP or member STAs 104 that are served by the AP 102 over one or more OBSS rTWT SPs.

In some examples, an AP 102 may be associated with multiple rTWT schedules that each correspond to different traffic flows (such as a level of traffic or a type of latency associated with the traffic) and/or different associated STAs 104. As such, communications from a given STA 104 associated with the AP 102 may interfere with one or more first rTWTs of the AP and may not interfere with one or more second rTWTs of the AP 102. In some examples, which one or more first rTWTs the given STA 104 may interfere with may be in accordance with which member STAs 104 are being served by the AP 102 during those respective rTWTs.

In some examples an AP 102 and/or an associated STA 104 may indicate (via one or more fields) support, or a level of support for comminating over TXOPs that overlap with OBSS rTWT SPs. In some examples, an AP 102 may indicate that a given STA 104 may communicate over TXOPs during OBSS rTWT SPs if the information of the report 210 from the STA 104 satisfies one or more criteria (such as interference for one or more rTWTs is below a threshold, a duration of a physical layer protocol data unit (PPDU), or a bandwidth of the PPDU). In some examples the AP 102 may indicate which rTWTs of a rTWT schedule a given STA 104 may communicate over (such as all of the rTWTs or a subset of rTWTs of the rTWT schedule).

In some examples, an AP 102 may indicate an update associated with a change in membership of one or more rTWTs of an OBSS rTWT schedule. One or more APs 102 and/or one or more STAs 104 may use the information of the membership update to determine whether to transmit over one or more OBSS rTWT SPs. For instance, if a membership of a first rTWT is updated to include STA 104-*b*, the STA 104-*a* and/or the AP 102-*a* may determine that transmissions originating at the STA 104-*a* may interfere with the STA 104-*b* for the first rTWT. As such, the STA 104-*a* may update to refrain from communicating during the first rTWT. A given STA 104 of the OBSS (or any non-AP) may refrain from tracking rTWT membership updates. As such, an associated AP 102 to the given STA 104 may assist by tracking the with reference to each rTWT schedule of each OBSS in the neighborhood with reference to each associated STA 104. For instance, if the AP 102-*b* updates membership for one or more rTWTs, the AP 102-*a* may track the membership update on behalf of the STAs 104 of the first BSS. In some examples, the APs 102 of the OBSS may monitor an rTWT specific field for updates associated rTWT (including updates to membership). One or more APs 102 of the OBSS may communicate updates associated with rTWT via coordinated medium access period signaling 205.

In some examples, one or more non-OBSS member wireless communication devices may communicate over one or more OBSS rTWT SPs, which may interfere with the one or more OBSS rTWT SPs. As such, the APs 102 and/or the STAs 104 of the OBSS may employ one or more mechanisms (such as machine learning based filtering) to identify respective memberships corresponding to each of the OBSS rTWT SPs. Such mechanisms may account for non-OBSS wireless communication devices when coordinating medium access periods for the OBSS.

In some examples, an AP 102 may transmit downlink communications to an associated STA 104 over an one or more OBSS rTWT SPs. For instance, the AP 102 may adjust one or more transmission parameters of a downlink transmission (such a transmission power or a beamform of the transmission) such that the interference of the downlink transmission has a level of interference with the one or more OBSS rTWT SPs that is below a threshold.

In some examples, a wireless communication device may transmit a message requesting an updated medium access period based on interference experienced during one or more medium access periods. For instance, the STA 104-*a* may transmit a medium access period (such as for a coordinated rTWT, a coordinated medium access period, or any enhanced versions thereof) update request to an AP 102. The medium access period update request may indicate, to the AP 102 (such as an associated AP 102), a request to update a rTWT schedule or rTWT agreement. In some examples, the medium access period update request may indicate one or more reasons (such as one or more reason codes) for requesting an update to a medium access period and/or a medium access schedule. A reason code may provide, for example, an indication of OBSS interference within a service period, among other reasons for requesting an update to one or more medium access periods.

As an example, the STA 104-*a* may be configured to transmit messages during a first OBSS rTWT SP. The STA

104-*a*, however, may experience interference from communications (such as communications by one or more other wireless communication devices) during the first OBSS rTWT SP. As such, the STA 104-*a* may transmit an rTWT update request, where the rTWT update request may include a field that indicates a reason that the STA 104-*a* is requesting an update to an existing rTWT schedule and/or a reason for requesting a new rTWT schedule. In some examples, the field of the rTWT update request may be a set of one or more bits associated with a reason code (such as an OBSS interference within an OBSS rTWT SP). Such signaling from the STA 104-*a* may provide a mechanism that can be used by the STA 104-*a* to notify the AP 102 a reason the STA 104-*a* is requesting an update to rTWT parameters (such as rTWT schedule parameters).

In accordance with receiving the reason code in the medium access period update request, the AP 102 may determine whether to reject or accept the STA 104 request to update the schedule. As such, the reason code may increase clarity at the AP 102 for whether to update an rTWT schedule, which may increase the QoS of the OBSS communications. The mechanisms described herein regarding the medium access period update request may be used for any type of coordinated medium access procedure between STAs 104 and APs 102, between multiple STA 104, or between multiple APs 102, or any combination thereof.

The techniques and mechanisms described with reference to FIG. 2 are with reference to rTWT coordination for wireless communication devices of an OBSS. However, it is understood that such techniques and mechanisms described herein may be applied to any coordinated medium access scheme.

Figure 3:
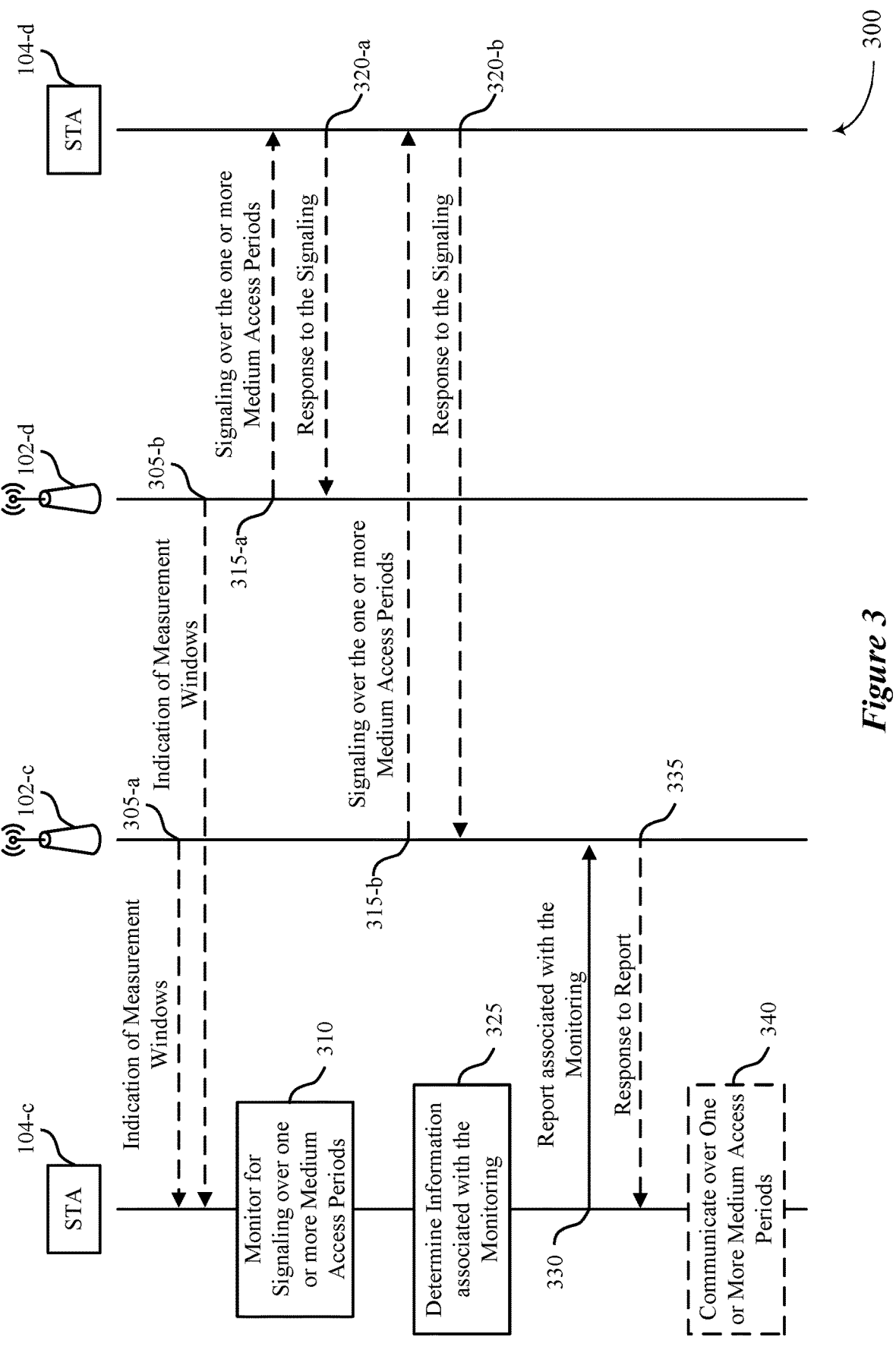
FIGS. 3-5 each show an example of a process flow that supports coordinated medium access period management for OBSSs.

FIG. 3 shows an example of a process flow 300 that supports coordinated medium access period management for OBSSs. In some examples, process flow 300 may implement aspects of wireless communication networks 100 and 200. Process flow 300 includes a STA 104-*c*, a STA 104-*d*, an AP 102-*c*, and an AP 102-*d*, which may be respective examples of STAs 104 and APs 102, as described with reference to FIGS. 1 and 2. STA 104-*c* and AP 102-*c* may be associated with a first BSS and STA 104-*d* and AP 102-*c* may be associated with a second BSS that is different from and neighbors the first BSS. As such, one or more of the STA 104-*c*, the STA 104-*d*, the AP 102-*c*, or the AP 102-*d* may be associated with an OBSS. Alternative examples of the following may be implemented, where some steps are performed in a different order than described or are not performed at all. In some examples, steps may include additional features not mentioned below, or further steps may be added. In addition, while process flow 300 shows processes between four devices, it should be understood that these processes may occur between any quantity of wireless communication devices and wireless communication device types. For example, the AP 102-*c* and the AP 102-*d* may service and/or be associated with any quantity of wireless communication devices (such as any quantity of STAs 104).

At 305, the STA 104-*c* may receive one or more indications of one or more respective measurement windows for one or more medium access periods, respectively. The AP 102-*c* or the AP 102-*d*, or both, may be an example of an AP that schedules one or more medium access periods used for enhanced medium access protection and resource reservation for delivery of latency-sensitive traffic. In some examples the one or more medium access periods may be one or more OBSS rTWT SPs or any other type of medium access periods. In some examples, the one or more medium access periods may correspond to communications between the AP 102-d and one or more STAs 104 of the second BSS (such as the STA 104-d).

In some examples, the STA 104-c may receive the one or more indications from the AP 102-c (at 305-a) and/or the AP 102-d (at 305-b). In some examples, the one or more indications of the one or more respective measurement windows are received in accordance with a periodicity. That is, each of the one or more respective measurement windows may be associated with a respective periodicity such that respective measurement windows repeat in accordance with the respective periodicity. In some examples, the one or more indications of the one or more respective measurement windows for the one or more medium access periods are received via one or more broadcast messages, one or more groupcast messages, one or more unicast messages, or any combination thereof.

At 310, the STA 104-c may monitor, over the one or more medium access periods, for communications between a AP 102-d and one or more STAs 104 of the second BSS (such as the STA 104-d). That is, the STA 104-c may monitor for communications by one or more other wireless communication devices. In some examples the one or more medium access periods may be configured for medium access and resource reservation for communications with the AP 102-d. For instance, the one or more medium access periods may be one or more rTWT SPs of an rTWT associated with the AP 102-d.

In some examples, the monitoring for the communications between the AP 102-d and the one or more STAs 104 of the second BSS is in accordance with the one or more respective measurement windows. For instance, a first medium access period may be associated with a first measurement window, and as such, the STA 104-c may monitor for communications for the first medium access period over the first measurement window.

In some examples, the one or more indications of the respective measurement windows (at 305) may indicate at least one medium access period for which measurements are prohibited. As such, the STA 104-c may refrain from monitoring for the communications over the at least one medium access period in accordance with the indication.

In some examples, the STA 104-c may monitor for the communications concurrent to an AP 102 exchanging signaling with STAs 104 of the second BSS. For example, at 315, the STA 104-d may receive signaling over the one or more medium access periods from the AP 102-d (at 315-a) or from the AP 102-c (at 315-b).

In some examples, at 315, the STA 104-d may receive one or more respective sounding frames over each of the one or more respective measurement windows. Additionally, or alternatively, at 315, the STA 104-d may receive one or more respective messages each including a respective BSRP trigger over each of the one or more respective measurement windows.

At 320, the STA 104-d may respond to the signaling received at 315. For example, the STA may transmit the response to the AP 102-d (at 320-a) or transmit the response to the AP 102-c (at 320-b). In examples in which the STA 104-d receives the one or more respective sounding frames, the STA 104-d may transmit for each of the one or more respective measurement windows in response to the one or more respective sounding frames, one or more respective sounding feedback messages over the one or more respective measurement windows. In examples in which the STA 104-d receives the one or more respective messages each including the BSRP trigger, the STA 104-d may transmit, for each of the one or more respective measurement windows in response to each respective BSRP trigger, one or more respective BSRs over the one or more respective measurement windows. In some examples, each respective BSRP trigger, or each of the one or more respective BSRs, or a combination thereof, indicates one or more transmission parameters. Such transmission parameters may assist with measurements performed by one or more other wireless communication devices (such as for path loss estimation).

Additionally, or alternatively, the STA 104-c may perform the operations at 315 and 320 with the AP 102-c or the AP 102-d for one or more second medium access periods associated with communications of the first BSS. For instance, the one or more second medium access periods may be one or more rTWT SPs of an rTWT schedule associated with the AP 102-c. As such, if the STA 104-c and/or other STAs 104 of the first BSS perform the operations at 315 and 320 for the one or more second medium access periods, one or more STAs 104 of the second BSS (such as the STA 104-d) may concurrently monitor for communications.

At 325, the STA 104-c may determine information associated with the monitoring over the one or more medium access periods. In some examples, the information may include one or more attributes of the communications between the AP 102-d and one or more STAs 104 of the second BSS (such as the STA 104-d). Such attributes obtained from detected communications may indicate whether the STA 104-c is able to communicate at the same time as one or more other wireless communication devices (such as the STA 104-d and/or the AP 102-d) over one or more medium access period without causing interference to the one or more other wireless communication devices.

At 330, the STA 104-c may transmit, to the AP 102-c associated with the first BSS, a report indicating the information associated with the monitoring over the one or more medium access periods. In some examples, the information associated with the monitoring over the one or more medium access periods is transmitted via an event report frame. In some examples, the information associated with the monitoring over the one or more medium access periods is transmitted via a header of a MAC layer or a PHY layer, or both. In some examples, the report indicating the information associated with the monitoring over the one or more medium access periods may be solicited by the AP 102-c. In some examples, the report indicating the information associated with the monitoring over the one or more medium access periods may be unsolicited by the AP 102-c. The report may include an indication that the STA 104-c does not detect any transmissions from one or more other wireless communication devices over the one or more medium access periods. Additionally, or alternatively, the report from the STA 104-c may include an indication of which OBSSs were detected when monitoring over the one or more medium access periods. That is, the report may include an indication that the STA 104-c detected communications between one or more wireless communication devices (such as STA 104-d and AP 102-d or other wireless communication devices associated with other BSSs), and the STA 104-c may include an indication of the OBSSs associated with the detected communications (which may be identified by a BSS color or BSSID).

In some examples, at 335, the STA 104-c may receive an indication of allowance to communicate with one or more wireless communication devices over a set of medium access periods that overlap with at least one of the one or more medium access periods. For example, the AP 102-c may determine (in accordance with the information included in the report) that the STA 104-*c* may communicate over the set medium access periods in accordance with the STA 104-*c* having a level of interference below a threshold over the set medium access periods. In some examples, the set of medium access periods may include TWT durations for the STA 104-*c* to communicate with the AP 102-*c*. Additionally, or alternatively, the set of medium access periods may include one or more P2P TWT durations, over which the STA 104-*c* may communicate with a second non-AP of the first BSS. In some examples, the indication for allowance communicate over the set of medium access periods may indicate a transmission duration (uplink duration and/or P2P duration), a transmission bandwidth (for the uplink and/or the P2P link), a transmission power (for the uplink and/or the P2P link), or any combination thereof. In some examples, when the STA 104-*c* receives the indication for allowance communicate over the set of medium access periods, the AP 102-*c* may transmit, to one or more wireless communication devices (such as the AP 102-*d*) an indication that at least one wireless communication device (such as the STA 104-*c*) has been allowed to communicate over at least one medium access period. Such an indication from the AP 102-*c* may be a flag (such as a 1-bit flag) or other indication that at least one wireless communication devices is allowed to communicate over a medium access period based on completed measurements. Additionally, or alternatively, such an indication from the AP 102-*c* may be broadcast or groupcast.

At 340, the STA 104-*c* may communicate over one or more of the set of medium access periods indicated by the AP 102-*c*, at 335. For example, the STA 104-*c* may transmit one or more uplink messages or receive one or more downlink messages from the AP 102-*c* in accordance with and over set of medium access periods. Additionally, or alternatively, the STA 104-*c* may transmit one or more P2P messages or receive one or more P2P messages from a non-AP device (such as a second STA 104 associated with the first BSS) in accordance with and over set of medium access periods.

Figure 4:
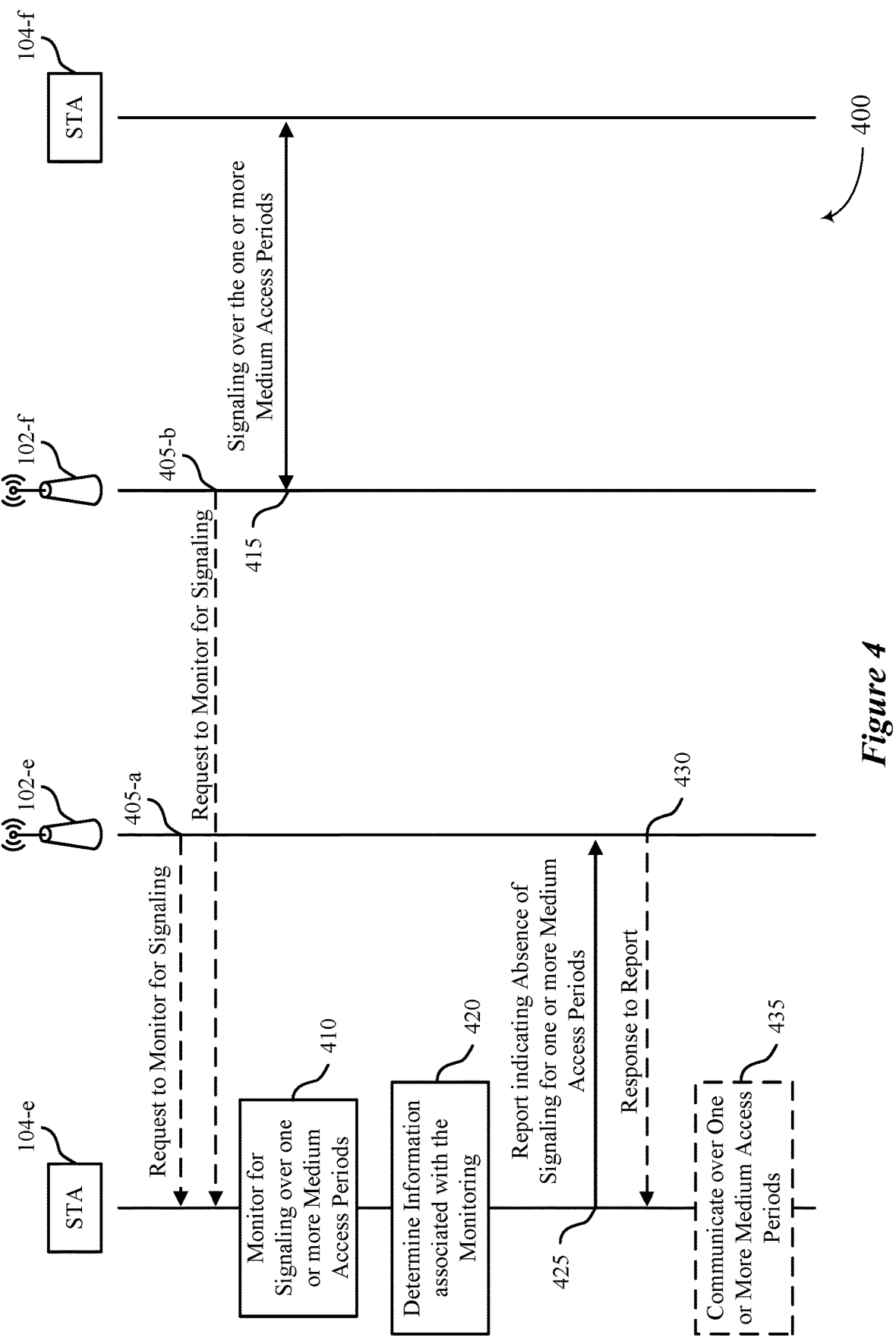

FIG. 4 shows an example of a process flow 400 that supports coordinated medium access period management for OBSSs. In some examples, process flow 400 may implement aspects of wireless communication networks 100 and 200 and process flow 300. Process flow 400 includes a STA 104-*e*, a STA 104-*f*, an AP 102-*e*, and an AP 102-*f*, which may be respective examples of STAs 104 and APs 102, as described with reference to FIGS. 1 and 2. STA 104-*e* and AP 102-*e* may be associated with a first BSS and STA 104-*f* and AP 102-*e* may be associated with a second BSS that is different from and neighbors the first BSS. One or more of the STA 104-*e*, the STA 104-*f*, the AP 102-*e*, or the AP 102-*f* may be associated with an OBSS. Alternative examples of the following may be implemented, where some steps are performed in a different order than described or are not performed at all. In some examples, steps may include additional features not mentioned below, or further steps may be added. In addition, while process flow 400 shows processes between four devices, it should be understood that these processes may occur between any quantity of wireless communication devices and wireless communication device types. For example, the AP 102-*e* and the AP 102-*f* may service and/or be associated with any quantity of wireless communication devices (such as any quantity of STAs 104).

In some examples, at 405, the STA 104-*e* may receive a request message that indicates at least one medium access period of one or more medium access periods for measuring communications between the AP 102-*f* and one or more STAs 104 of the second BSS (such as STA 104-*f*). In some examples, the request message indicates a BSSID or a BSS color associated with the second BSS that is associated with the at least one medium access period. In some examples, the request message indicates each medium access period of one or more medium access periods associated with the OBSS (such as all OBSS rTWT SPs). In some examples, the request message is received from the AP 102-*e* (at 405-*a*) or the AP 102-*f* (at 405-*b*) via unicast or groupcast.

At 410, the STA 104-*e* may monitor, over one or more medium access periods, for communications between a AP 102-*f* and one or more STAs 104 of the second BSS (such as the STA 104-*f*). In some examples the one or more medium access periods may be configured for medium access and resource reservation for communications with the AP 102-*f*. For instance, the one or more medium access periods may be one or more rTWT SPs of an rTWT schedule associated with the AP 102-*f*.

At 415, the AP 102-*f* and the one or more STAs of the second BSS (such as the STA 104-*f*) may communicate over the one or more medium access periods. For instance, the STA 104-*a* may be a member STA 104 that is designated by the AP 102-*f* to communicate traffic over the one or more medium access periods (such as one or more rTWT SPs of an OBSS rTWT schedule).

At 420, the STA 104-*e* may determine information associated with the monitoring over the one or more medium access periods. In some examples, the information may include one or more attributes of the communications between the AP 102-*f* and one or more STAs 104 of the second BSS (such as the STA 104-*f*).

At 425, the STA 104-*e* may transmit to the AP 102-*e* associated with the first BSS, a report indicating the information associated with the monitoring over the one or more medium access periods. For example, the information associated with the monitoring over the one or more medium access periods may include an indication that the STA 104-*e* detected an absence of communications over the one or more medium access periods while monitoring for the communications. In some examples, the information associated with the monitoring over the one or more medium access periods is transmitted via an event report frame. In some examples, the information associated with the monitoring over the one or more medium access periods is transmitted via a header of a MAC layer or a PHY layer, or both. In some examples, the STA 104-*e* transmits the report in accordance with receiving the request at 405. In some examples, the report is unsolicited, and the absence of communications is indicated for at least one medium access period of the one or more medium access periods.

In some examples, at 430, the STA 104-*e* may receive an indication of allowance to communicate with one or more wireless communication devices over a set of medium access periods that overlap with at least one of the one or more medium access periods. For example, the AP 102-*e* may determine (in accordance with the information included in the report) that the STA 104-*e* may communicate over the set medium access periods in accordance with the STA 104-*e* having a level of interference below a threshold over the set medium access periods. In some examples, the set of medium access periods may include TWT durations for the STA 104-*e* to communicate with the AP 102-*e*. Additionally, or alternatively, the set of medium access periods may include one or more P2P TWT durations, over which the STA 104-*e* may communicate with a second non-AP of the first BSS. In some examples, the indication for allowance to indicate over the set of medium access periods may indicate a transmission duration (uplink duration and/or P2P duration), a transmission bandwidth (for the uplink and/or the P2P link), a transmission power (for the uplink and/or the P2P link), or any combination thereof.

At 440, the STA 104-*e* may communicate over one or more of the set of medium access periods indicated by the AP 102-*e*, at 435. For example, the STA 104-*e* may transmit one or more uplink messages or receive one or more downlink messages from the AP 102-*e* in accordance with and over set of medium access periods. Additionally, or alternatively, the STA 104-*e* may transmit one or more P2P messages or receive one or more P2P messages from a non-AP device (such as a second STA 104 associated with the first BSS) in accordance with and over set of medium access periods.

Figure 5:
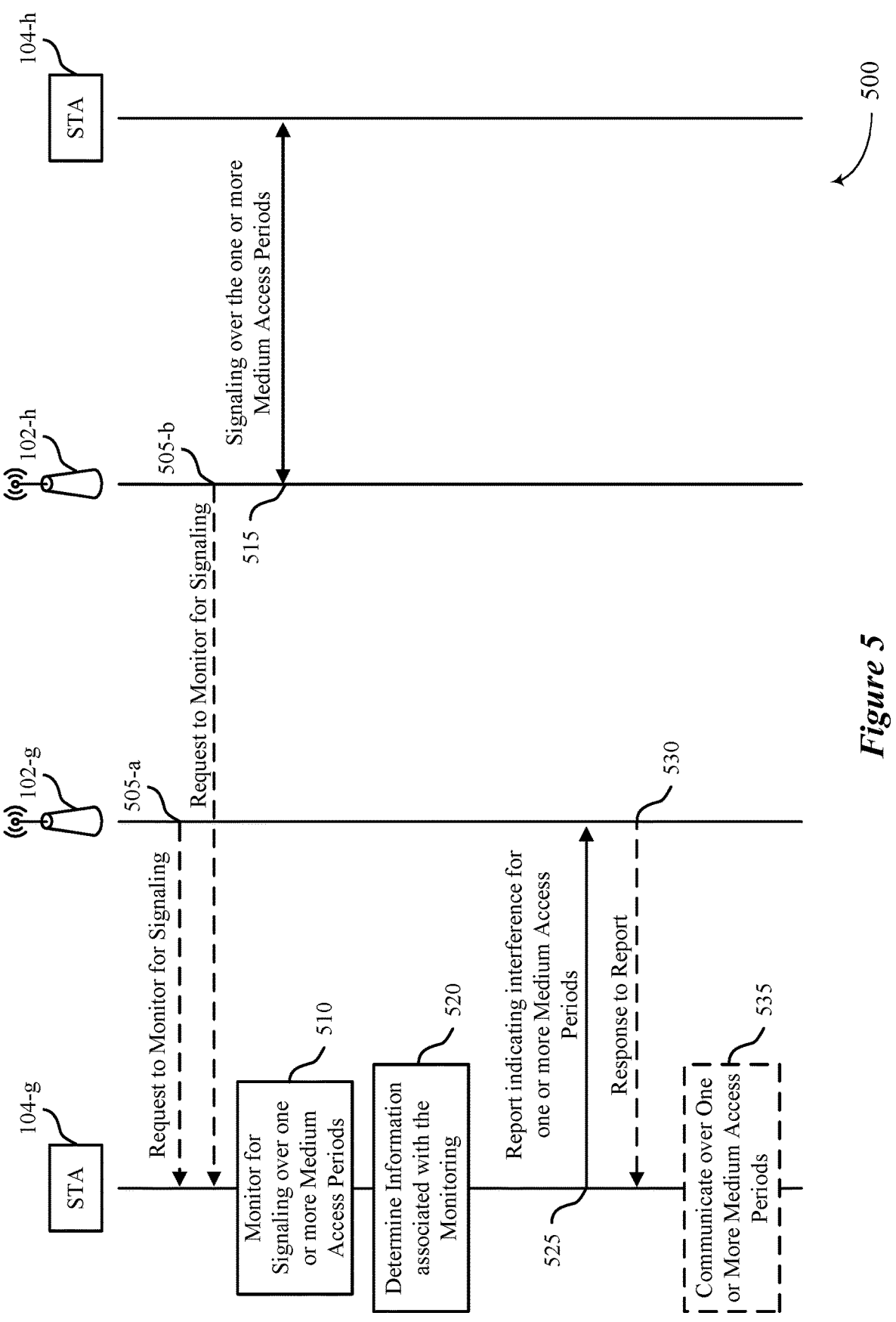

FIG. 5 shows an example of a process flow 500 that supports coordinated medium access period management for OBSSs. In some examples, process flow 500 may implement aspects of wireless communication networks 100 and 200, process flow 300, and process flow 400. Process flow 500 includes a STA 104-*g*, a STA 104-*h*, an AP 102-*g*, and an AP 102-*h*, which may be respective examples of STAs 104 and APs 102, as described with reference to FIGS. 1 and 2. STA 104-*g* and AP 102-*g* may be associated with a first BSS and STA 104-*h* and AP 102-*g* may be associated with a second BSS that is different from and neighbors the first BSS. The STA 104-*g*, the STA 104-*h*, the AP 102-*g*, and the AP 102-*h* may be associated with an OBSS. Alternative examples of the following may be implemented, where some steps are performed in a different order than described or are not performed at all. In some examples, steps may include additional features not mentioned below, or further steps may be added. In addition, while process flow 500 shows processes between four devices, it should be understood that these processes may occur between any quantity of wireless communication devices and wireless communication device types. For example, the AP 102-*g* and the AP 102-*h* may service and/or be associated with any quantity of wireless communication devices (such as any quantity of STAs 104).

In some examples, at 505, the STA 104-*g* may receive a request message that indicates at least one medium access period of one or more medium access periods for measuring communications between the AP 102-*h* and one or more STAs 104 of the second BSS (such as STA 104-*h*). In some examples, the request message is received from the AP 102-*g* (at 505-*a*) or the AP 102-*h* (at 505-*b*) via unicast or groupcast.

At 510, the STA 104-*g* may monitor, over one or more medium access periods, for communications between a AP 102-*h* and one or more STAs 104 of the second BSS (such as the STA 104-*h*). In some examples the one or more medium access periods may be configured for medium access and resource reservation for communications with the AP 102-*h*. For instance, the one or more medium access periods may be one or more rTWT SPs of an rTWT schedule associated with the AP 102-*h*.

At 515, the AP 102-*h* and the one or more STAs of the second BSS (such as the STA 104-*h*) may communicate over the one or more medium access periods. For instance, the STA 104-*a* may be a member STA 104 that is designated by the AP 102-*h* to communicate traffic over the one or more medium access periods (such as one or more rTWTs of an OBSS rTWT schedule).

At 520, the STA 104-*g* may determine information associated with the monitoring over the one or more medium access periods. In some examples, the information may include one or more attributes of the communications between the AP 102-*h* and one or more STAs 104 of the second BSS (such as the STA 104-*h*).

At 525, the STA 104-*g* may transmit to the AP 102-*g* associated with the first BSS, a report indicating the information associated with the monitoring over the one or more medium access periods. For example, the information associated with the monitoring over the one or more medium access periods may include an indication that the STA 104-*g* detected the communications over the one or more medium access periods while monitoring for the communications. In some examples, the information may include an indication of an OBSS associated with the detected communications. In some examples, the report indicates a range of RSSIs associated with each of the one or more medium access periods for the OBSS. In some examples, the report indicates a BSS color or BSSID associated with the OBSS. In some examples, the information associated with the monitoring over the one or more medium access periods is transmitted via an event report frame. In some examples, the information associated with the monitoring over the one or more medium access periods is transmitted via a header of a MAC layer or a PHY layer, or both. In some examples, the STA 104-*g* transmits the report in accordance with receiving the request at 505. In some examples, the report is unsolicited, and the communications detected by the STA 104-*g* are indicated for at least one medium access period of the one or more medium access periods.

In some examples, at 530, the STA 104-*g* may receive an indication of allowance to communicate with one or more wireless communication devices over a set of medium access periods that overlap with at least one of the one or more medium access periods. For example, the AP 102-*g* may determine (in accordance with the information included in the report) that the STA 104-*g* may communicate over the set medium access periods in accordance with the STA 104-*g* having a level of interference below a threshold over the set medium access periods. In some examples, the set of medium access periods may include TWT durations for the STA 104-*g* to communicate with the AP 102-*g*. Additionally, or alternatively, the set of medium access periods may include one or more P2P TWT durations, over which the STA 104-*g* may communicate with a second non-AP of the first BSS. In some examples, the indication for allowance to indicate over the set of medium access periods may indicate a transmission duration (uplink duration and/or P2P duration), a transmission bandwidth (for the uplink and/or the P2P link), a transmission power (for the uplink and/or the P2P link), or any combination thereof.

At 540, the STA 104-*g* may communicate over one or more of the set of medium access periods indicated by the AP 102-*g*, at 535. For example, the STA 104-*g* may transmit one or more uplink messages or receive one or more downlink messages from the AP 102-*g* in accordance with and over set of medium access periods. Additionally, or alternatively, the STA 104-*g* may transmit one or more P2P messages or receive one or more P2P messages from a non-AP device (such as a second STA 104 associated with the first BSS) in accordance with and over set of medium access periods.

Figure 6:
FIG. 6 shows a block diagram of an example wireless communication device that supports coordinated medium access period management for OBSSs.

FIG. 6 shows a block diagram of an example wireless communication device 600 that supports coordinated medium access period management for OBSSs. In some examples, the wireless communication device 600 is configured to perform the process 800 described with reference to FIG. 8. The wireless communication device 600 may include one or more chips, SoCs, chipsets, packages, components or devices that individually or collectively constitute or comprise a processing system. The processing system may interface with other components of the wireless communication device 600, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 600 may transmit the information output from the chip. In such an example, the second interface may refer to an interface between the processing system of the chip and a reception component, such that the wireless communication device 600 may receive information that is passed to the processing system. In some such examples, the first interface also may obtain information, such as from the transmission component, and the second interface also may output information, such as to the reception component.

The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, In some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some examples, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some examples, one or more processors of the processing system include or implement one or more of the radios, RF chains or transceivers.

In some examples, the wireless communication device 600 can be configurable or configured for use in a STA, such as the STA 104 described with reference to FIG. 1. In some other examples, the wireless communication device 600 can be a STA that includes such a processing system and other components including multiple antennas. The wireless communication device 600 is capable of transmitting and receiving wireless communications in the form of, for example, wireless packets. For example, the wireless communication device 600 can be configurable or configured to transmit and receive packets in the form of physical layer PPDUs and MPDUs conforming to one or more of the IEEE 802.11 family of wireless communication protocol standards. In some other examples, the wireless communication device 600 can be configurable or configured to transmit and receive signals and communications conforming to one or more 3GPP specifications including those for 5G NR or 6G. In some examples, the wireless communication device 600 also includes or can be coupled with one or more application processors which may be further coupled with one or more other memories. In some examples, the wireless communication device 600 further includes a user interface (UI) (such as a touchscreen or keypad) and a display, which may be integrated with the UI to form a touchscreen display that is coupled with the processing system. In some examples, the wireless communication device 600 may further include one or more sensors such as, for example, one or more inertial sensors, accelerometers, temperature sensors, pressure sensors, or altitude sensors, that are coupled with the processing system.

The wireless communication device 600 includes a communications monitoring component 625, an attribute determination component 630, a medium access reporting component 635, an uplink messaging component 640, a sounding frame reception component 645, a feedback messaging component 650, an BSRP reception component 655, and an BSR component 660. Portions of one or more of the communications monitoring component 625, the attribute determination component 630, the medium access reporting component 635, the uplink messaging component 640, the sounding frame reception component 645, the feedback messaging component 650, the BSRP reception component 655, and the BSR component 660 may be implemented at least in part in hardware or firmware. For example, one or more of the communications monitoring component 625, the attribute determination component 630, the medium access reporting component 635, the uplink messaging component 640, the sounding frame reception component 645, the feedback messaging component 650, the BSRP reception component 655, and the BSR component 660 may be implemented at least in part by at least one modem. In some examples, at least some of the communications monitoring component 625, the attribute determination component 630, the medium access reporting component 635, the uplink messaging component 640, the sounding frame reception component 645, the feedback messaging component 650, the BSRP reception component 655, and the BSR component 660 are implemented at least in part by at least one processor and as software stored in at least one memory. For example, portions of one or more of the communications monitoring component 625, the attribute determination component 630, the medium access reporting component 635, the uplink messaging component 640, the sounding frame reception component 645, the feedback messaging component 650, the BSRP reception component 655, and the BSR component 660 may be implemented at least in part by a processor and software in the form of processor-executable code stored in the memory.

In some examples, the at least one processor may be a component of a processing system. A processing system may generally refer to a system or series of machines or components that receives inputs and processes the inputs to produce a set of outputs (which may be passed to other systems or components of, for example, the wireless communication device 600). For example, a processing system of the wireless communication device 600 may refer to a system including the various other components or subcomponents of the wireless communication device, such as the at least one processor, or at least one transceiver, or at least one communications manager, or other components or combinations of components of the wireless communication device 600. The processing system of the wireless communication device 600 may interface with other components of the wireless communication device 600, and may process information received from other components (such as inputs or signals) or output information to other components. For example, a chip or modem of the wireless communication device 600 may include a processing system, a first interface to output information and a second interface to obtain information. In some examples, the first interface may refer to an interface between the processing system of the chip or modem and a transmitter, such that the wireless communication device 600 may transmit information output from the chip or modem. In some examples, the second interface may refer to an interface between the processing system of the chip or modem and a receiver, such that the wireless communication device 600 may obtain information or signal inputs, and one or more attributes may be passed to the processing system. A person having ordinary skill in the art will readily recognize that the first interface also may obtain information or signal inputs, and the second interface also may output information or signal outputs.

The STA 620 may support wireless communications in accordance with examples as disclosed herein. The communications monitoring component 625 is capable of, configured to, or operable to support a means for monitoring, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices. The attribute determination component 630 is capable of, configured to, or operable to support a means for determining information associated with the monitoring over the one or more medium access periods, the information including one or more attributes of the communications between the second wireless communication device and one or more third wireless communication devices. The medium access reporting component 635 is capable of, configured to, or operable to support a means for transmitting, to a fourth wireless communication device associated with the first BSS, a report indicating one or more attributes associated with the communications over the one or more medium access periods.

In some examples, one or more attributes associated with the monitoring over the one or more medium access periods includes an indication that the first wireless communication device detected an absence of communications over the one or more medium access periods while monitoring for the communications.

In some examples, the report is unsolicited by the fourth wireless communication device, and the absence of communications is indicated for at least one medium access period of the one or more medium access periods.

In some examples, the communications monitoring component 625 is capable of, configured to, or operable to support a means for receiving a request message that indicates at least one medium access period of the one or more medium access periods for measuring the communications between the second wireless communication device and the one or more third wireless communication devices, where the report is transmitted in response to the request message.

In some examples, the request message indicates a BSS identifier or a BSS color associated with the second BSS that is associated with the at least one medium access period.

In some examples, the request message indicates each medium access period of the one or more medium access periods.

In some examples, the request message is received from the fourth wireless communication device or the second wireless communication device via unicast or groupcast.

In some examples, the communications monitoring component 625 is capable of, configured to, or operable to support a means for receiving one or more indications of one or more respective measurement windows for the one or more medium access periods, respectively, where the monitoring for the communications communicated between the second wireless communication device and the one or more third wireless communication devices is in accordance with the one or more respective measurement windows.

In some examples, the one or more indications of the one or more respective measurement windows are received from the fourth wireless communication device.

In some examples, the one or more indications of the one or more respective measurement windows are received from the second wireless communication device.

In some examples, each of the one or more indications further indicate at least one medium access period of the one or more medium access periods for which measurements are prohibited, and the communications monitoring component 625 is capable of, configured to, or operable to support a means for refraining from monitoring over the at least one medium access period in accordance with the indication.

In some examples, the one or more indications of the one or more respective measurement windows are received in accordance with a periodicity.

In some examples, the sounding frame reception component 645 is capable of, configured to, or operable to support a means for receiving one or more respective sounding frames from the fourth wireless communication device or the second wireless communication device over each of the one or more respective measurement windows. In some examples, the feedback messaging component 650 is capable of, configured to, or operable to support a means for transmitting, for each of the one or more respective measurement windows in response to the one or more respective sounding frames, one or more respective sounding feedback messages over the one or more respective measurement windows.

In some examples, the BSRP reception component 655 is capable of, configured to, or operable to support a means for receiving one or more respective messages each including a respective BSRP trigger from the fourth wireless communication device or the second wireless communication device over each of the one or more respective measurement windows. In some examples, the BSR component 660 is capable of, configured to, or operable to support a means for transmitting, for each of the one or more respective measurement windows in response to each respective BSRP trigger, one or more respective buffer status reports over the one or more respective measurement windows.

In some examples, each respective BSRP trigger, or each of the one or more respective buffer status reports, or a combination thereof, indicates one or more transmission parameters.

In some examples, the one or more indications of the one or more respective measurement windows for the one or more medium access periods are received via one or more broadcast messages, one or more groupcast messages, one or more unicast messages, or any combination thereof.

In some examples, one or more attributes associated with the monitoring over the one or more medium access periods includes an indication that the first wireless communication device detected the communications over the one or more medium access periods while monitoring for the communications, the information including an indication of an OBSS associated with the communications.

In some examples, the report indicates a range of received signal strength indicators associated with each of the one or more medium access periods for the OBSS.

In some examples, the report indicates a BSS color or BSS identifier associated with the OBSS.

In some examples, the report includes an unsolicited report from the first wireless communication device.

In some examples, the communications monitoring component 625 is capable of, configured to, or operable to support a means for receiving a request message that indicates at least one medium access period of the one or more medium access periods for measuring the communications between the second wireless communication device and the one or more third wireless communication devices, where transmitting the report is in response to the request message.

In some examples, the communications monitoring component 625 is capable of, configured to, or operable to support a means for receiving, from the fourth wireless communication device, an indication to communicate with the fourth wireless communication device over a set of medium access periods that overlap with at least one of the one or more medium access periods. In some examples, the uplink messaging component 640 is capable of, configured to, or operable to support a means for transmitting one or more uplink messages to the fourth wireless communication device in accordance with the indication to communicate with the fourth wireless communication device.

In some examples, the indication to communicate with the fourth wireless communication device indicates an uplink transmission duration, an uplink transmission bandwidth, an uplink transmission power, or any combination thereof, for communicating with the fourth wireless communication device over the set of medium access periods that overlap with at least one of the one or more medium access periods.

In some examples, the one or more attributes associated with the monitoring over the one or more medium access periods is transmitted via an event report frame.

In some examples, the one or more attributes associated with the monitoring over the one or more medium access periods is transmitted via a header of a medium access control layer or a physical layer, or both.

In some examples, the first wireless communication device is a station, the second wireless communication device is a neighboring access point, the one or more third wireless communication devices are one or more stations, and the fourth wireless communication device is an access point currently servicing the first wireless communication device.

Figure 7:
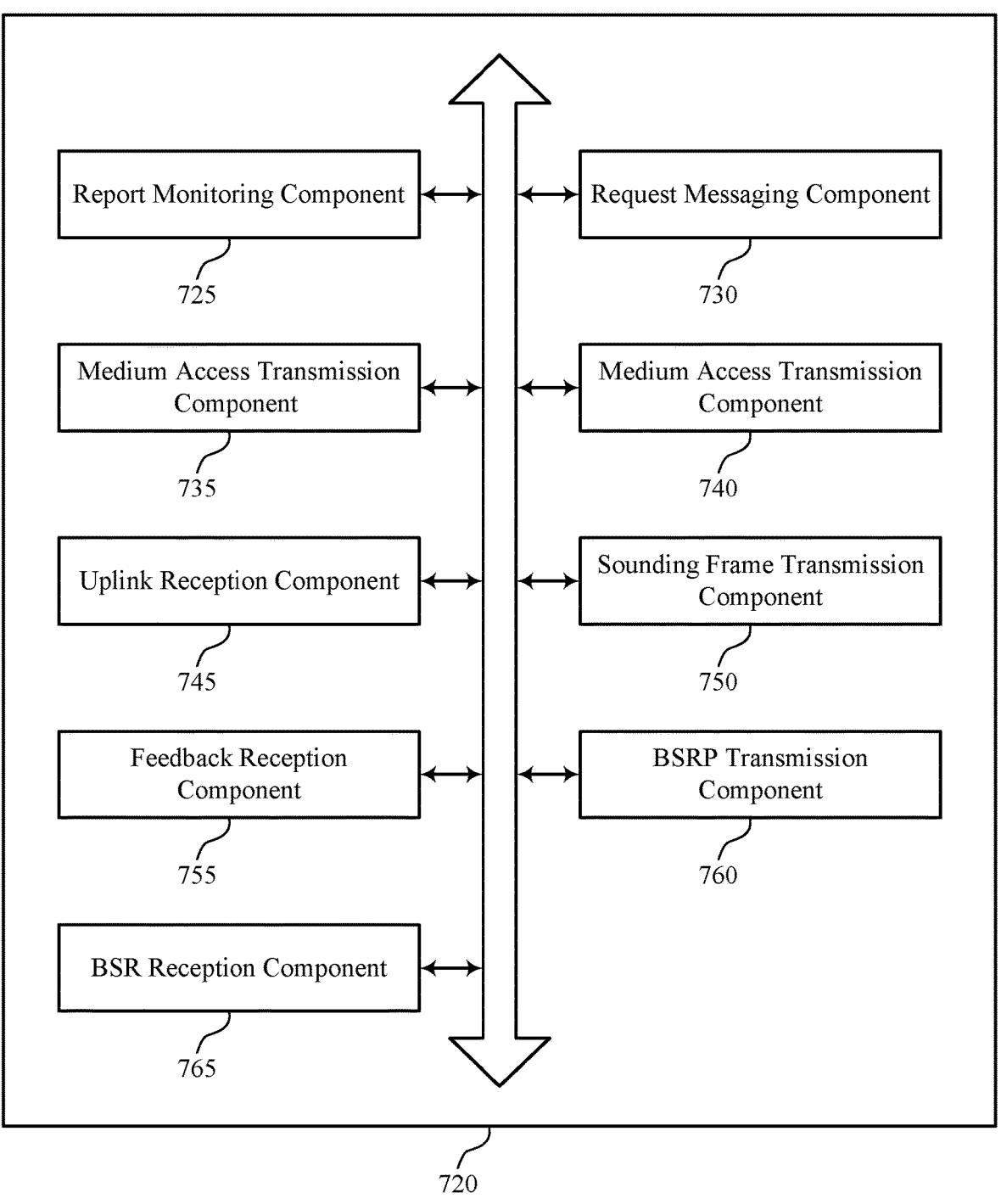
FIG. 7 shows a block diagram of an example wireless communication device that supports coordinated medium access period management for OBSSs.

FIG. 7 shows a block diagram of an example wireless communication device 700 that supports coordinated medium access period management for OBSSs. In some examples, the wireless communication device 700 is configured to perform the process 900 described with reference to FIG. 9. The wireless communication device 700 may include one or more chips, SoCs, chipsets, packages, components or devices that individually or collectively constitute or comprise a processing system. The processing system may interface with other components of the wireless communication device 700, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 700 may transmit the information output from the chip. In such an example, the second interface may refer to an interface between the processing system of the chip and a reception component, such that the wireless communication device 700 may receive information that is passed to the processing system. In some such examples, the first interface also may obtain information, such as from the transmission component, and the second interface also may output information, such as to the reception component.

The processing system of the wireless communication device 700 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, In some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some examples, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some examples, one or more processors of the processing system include or implement one or more of the radios, RF chains or transceivers.

In some examples, the wireless communication device 700 can be configurable or configured for use in an AP, such as the AP 102 described with reference to FIG. 1. In some other examples, the wireless communication device 700 can be an AP that includes such a processing system and other components including multiple antennas. The wireless communication device 700 is capable of transmitting and receiving wireless communications in the form of, for example, wireless packets. For example, the wireless communication device 700 can be configurable or configured to transmit and receive packets in the form of physical layer PPDUs and MPDUs conforming to one or more of the IEEE 802.11 family of wireless communication protocol standards. In some other examples, the wireless communication device 700 can be configurable or configured to transmit and receive signals and communications conforming to one or more 3GPP specifications including those for 5G NR or 6G. In some examples, the wireless communication device 700 also includes or can be coupled with one or more application processors which may be further coupled with one or more other memories. In some examples, the wireless communication device 700 further includes at least one external network interface coupled with the processing system that enables communication with a core network or backhaul network that enables the wireless communication device 700 to gain access to external networks including the Internet.

The wireless communication device 700 includes a report monitoring component 725, a request messaging component 730, a medium access transmission component 735, a medium access transmission component 740, an uplink reception component 745, a sounding frame transmission component 750, a feedback reception component 755, an BSRP transmission component 760, and an BSR reception component 765. Portions of one or more of the report monitoring component 725, the request messaging component 730, the medium access transmission component 735, the medium access transmission component 740, the uplink reception component 745, the sounding frame transmission component 750, the feedback reception component 755, the BSRP transmission component 760, and the BSR reception component 765 may be implemented at least in part in hardware or firmware. For example, one or more of the report monitoring component 725, the request messaging component 730, the medium access transmission component 735, the medium access transmission component 740, the uplink reception component 745, the sounding frame transmission component 750, the feedback reception component 755, the BSRP transmission component 760, and the BSR reception component 765 may be implemented at least in part by at least one modem. In some examples, at least some of the report monitoring component 725, the request messaging component 730, the medium access transmission component 735, the medium access transmission component 740, the uplink reception component 745, the sounding frame transmission component 750, the feedback reception component 755, the BSRP transmission component 760, and the BSR reception component 765 are implemented at least in part by at least one processor and as software stored in at least one memory. For example, portions of one or more of the report monitoring component 725, the request messaging component 730, the medium access transmission component 735, the medium access transmission component 740, the uplink reception component 745, the sounding frame transmission component 750, the feedback reception component 755, the BSRP transmission component 760, and the BSR reception component 765 may be implemented at least in part by a processor and software in the form of processor-executable code stored in a memory.

In some examples, the at least one processor may be a component of a processing system. A processing system may generally refer to a system or series of machines or components that receives inputs and processes the inputs to produce a set of outputs (which may be passed to other systems or components of, for example, the wireless communication device 700). For example, a processing system of the wireless communication device 700 may refer to a system including the various other components or subcomponents of the wireless communication device 700, such as the at least one processor, or at least one transceiver, or at least one communications manager, or other components or combinations of components of the wireless communication device 700. The processing system of the wireless communication device 700 may interface with other components of the wireless communication device 700, and may process information received from other components (such as inputs or signals) or output information to other components. For example, a chip or modem of the wireless communication device 700 may include a processing system, a first interface to output information and a second interface to obtain information. In some examples, the first interface may refer to an interface between the processing system of the chip or modem and a transmitter, such that the wireless communication device 700 may transmit information output from the chip or modem. In some examples, the second interface may refer to an interface between the processing system of the chip or modem and a receiver, such that the wireless communication device 700 may obtain information or signal inputs, and the information may be passed to the processing system. A person having ordinary skill in the art will readily recognize that the first interface also may obtain information or signal inputs, and the second interface also may output information or signal outputs.

The AP 720 may support wireless communications in accordance with examples as disclosed herein. The report monitoring component 725 is capable of, configured to, or operable to support a means for receiving, from a first wireless communication device in association with the fourth wireless communication device, a report indicating one or more attributes associated with monitoring by the first wireless communication device for the communications associated with communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

In some examples, the one or more attributes associated with the monitoring over the one or more medium access periods includes an indication that the first wireless communication device detected an absence of communications over the one or more medium access periods while monitoring for the communications.

In some examples, the report is unsolicited by the fourth wireless communication device, and the absence of communications is indicated for at least one medium access period of the one or more medium access periods.

In some examples, the request messaging component 730 is capable of, configured to, or operable to support a means for transmitting a request message that indicates at least one medium access period of the one or more medium access periods for measuring the communications communicated between the second wireless communication device and the one or more third wireless communication devices, where the report is received in response to the request message.

In some examples, the request message indicates a BSS identifier or a BSS color of associated with the second BSS that is associated with the at least one medium access period.

In some examples, the request message indicates each medium access period of the one or more medium access periods.

In some examples, the request message is transmitted by the fourth wireless communication device via unicast or groupcast.

In some examples, the medium access transmission component 735 is capable of, configured to, or operable to support a means for transmitting one or more indications of one or more respective measurement windows for the one or more medium access periods, respectively, where the monitoring for the communications communicated between the second wireless communication device and the one or more third wireless communication devices is in accordance with the one or more respective measurement windows.

In some examples, each of the one or more indications further indicate at least one medium access period of the one or more medium access periods for which measurements are prohibited by the first wireless communication device.

In some examples, the one or more indications of the one or more respective measurement windows are received in accordance with a periodicity.

In some examples, the sounding frame transmission component 750 is capable of, configured to, or operable to support a means for transmitting one or more respective sounding frames to the first wireless communication device over each of the one or more respective measurement windows. In some examples, the feedback reception component 755 is capable of, configured to, or operable to support a means for receiving, for each of the one or more respective measurement windows in response to the one or more respective sounding frames, one or more respective sounding feedback messages over the one or more respective measurement windows.

In some examples, the BSRP transmission component 760 is capable of, configured to, or operable to support a means for transmitting one or more respective messages each including a respective BSRP trigger to the first wireless communication device over each of the one or more respective measurement windows. In some examples, the BSR reception component 765 is capable of, configured to, or operable to support a means for receiving, for each of the one or more respective measurement windows in response to each respective BSRP trigger, one or more respective buffer status reports over the one or more respective measurement windows.

In some examples, each respective BSRP trigger, or each of the one or more respective buffer status reports, or a combination thereof, indicates one or more transmission parameters.

In some examples, the one or more indications of the one or more respective measurement windows for the one or more medium access periods are transmitted via one or more broadcast messages, one or more groupcast messages, one or more unicast messages, or any combination thereof.

In some examples, the one or more attributes associated with the monitoring over the one or more medium access periods includes an indication that the first wireless communication device detected the communications over the one or more medium access periods while monitoring for the communications, the one or more attributes including an indication of an OBSS associated with the communications.

In some examples, the report indicates a range of received signal strength indicators associated with each of the one or more medium access periods for the OBSS.

In some examples, the report indicates a BSS color or BSS identifier associated with the OBSS.

In some examples, the report includes an unsolicited report from the first wireless communication device.

In some examples, the request messaging component 730 is capable of, configured to, or operable to support a means for transmitting a request message that indicates at least one medium access period of the one or more medium access periods for measuring the communications communicated between the second wireless communication device and the one or more third wireless communication devices, where receiving the report is in response to the request message.

In some examples, the medium access transmission component 740 is capable of, configured to, or operable to support a means for transmitting, to the first wireless communication device, an indication to communicate with the fourth wireless communication device over a set of medium access periods that overlap with at least one of the one or more medium access periods. In some examples, the uplink reception component 745 is capable of, configured to, or operable to support a means for receiving one or more uplink messages from the first wireless communication device in accordance with the indication to communicate with the fourth wireless communication device.

In some examples, the indication to communicate with the fourth wireless communication device indicates an uplink transmission duration, an uplink transmission bandwidth, an uplink transmission power, or any combination thereof, for communicating with the fourth wireless communication device over the set of medium access periods that overlap with at least one of the one or more medium access periods.

In some examples, the one or more attributes associated with the monitoring over the one or more medium access periods is received via an event report frame.

In some examples, the one or more attributes associated with the monitoring over the one or more medium access periods includes is received via a header of a medium access control layer or a physical layer, or both.

In some examples, the first wireless communication device is a station, the second wireless communication device is a neighboring access point, the one or more third wireless communication devices are one or more stations, and the fourth wireless communication device is an access point currently servicing the first wireless communication device.

FIG. 8 shows a flowchart illustrating an example process 800 performable at a wireless STA that supports coordinated medium access period management for OBSSs. The operations of the process 800 may be an example of a method implemented by a wireless STA or its components as described herein. For example, the process 800 may be performed by a wireless communication device, such as the wireless communication device 600 described with reference to FIG. 6, operating as or within a wireless STA. In some examples, the process 800 may be performed by a wireless STA, such as one of the STAs 104 described with reference to FIG. 1.

In some examples, in block 805, the wireless STA may monitor, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices. The operations of block 805 may be performed in accordance with examples as disclosed herein. In some examples, aspects of the operations of block 805 may be performed by a communications monitoring component 625 as described with reference to FIG. 6.

In some examples, in block 810, the wireless STA may transmit, to a fourth wireless communication device associated with the first BSS, a report indicating one or more attributes associated with the communications over the one or more medium access periods. The operations of block 810 may be performed in accordance with examples as disclosed herein. In some examples, aspects of the operations of block 810 may be performed by a medium access reporting component 635 as described with reference to FIG. 6.

FIG. 9 shows a flowchart illustrating an example process 900 performable at a wireless AP that supports coordinated medium access period management for OBSSs. The operations of the process 900 may be an example of a method implemented by a wireless AP or its components as described herein. For example, the process 900 may be performed by a wireless communication device, such as the wireless communication device 700 described with reference to FIG. 7, operating as or within a wireless AP. In some examples, the process 900 may be performed by a wireless AP, such as one of the APs 102 described with reference to FIG. 1.

In some examples, in block 905, the wireless AP may receive, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices. The operations of block 905 may be performed in accordance with examples as disclosed herein. In some examples, aspects of the operations of block 905 may be performed by a report monitoring component 725 as described with reference to FIG. 7.

Implementation examples are described in the following numbered clauses:

Clause 1: A method for wireless communications by a first wireless communication device, comprising: monitoring, over one or more medium access periods, for communications between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices; transmitting, to a fourth wireless communication device associated with the first BSS, a report indicating one or more attributes associated with the communications over the one or more medium access periods.

Clause 2: The method of clause 1, wherein the one or more attributes associated with the communications over the one or more medium access periods comprises an indication that the first wireless communication device detected an absence of the communications over the one or more medium access periods while monitoring for the communications.

Clause 3: The method of clause 2, wherein the report is unsolicited by the fourth wireless communication device, and the absence of the communications is indicated for at least one medium access period of the one or more medium access periods.

Clause 4: The method of any of clauses 1 through 3, further comprising: receiving a request message that indicates at least one medium access period of the one or more medium access periods for measuring the communications between the second wireless communication device and the one or more third wireless communication devices, wherein the report is transmitted in response to the request message.

Clause 5: The method of clause 4, wherein the request message indicates a BSS identifier or a BSS color associated with the second BSS that is associated with the at least one medium access period.

Clause 6: The method of any of clauses 4 through 5, wherein the request message indicates each medium access period of the one or more medium access periods.

Clause 7: The method of any of clauses 4 through 6, wherein the request message is received from the fourth wireless communication device or the second wireless communication device via unicast or groupcast.

Clause 8: The method of any of clauses 1 through 7, further comprising: receiving one or more indications of one or more respective measurement windows for the one or more medium access periods, respectively, wherein the monitoring for the communications between the second wireless communication device and the one or more third wireless communication devices is in accordance with the one or more respective measurement windows.

Clause 9: The method of clause 8, wherein the one or more indications of the one or more respective measurement windows are received from the fourth wireless communication device.

Clause 10: The method of any of clauses 8 through 9, wherein the one or more indications of the one or more respective measurement windows are received from the second wireless communication device.

Clause 11: The method of any of clauses 8 through 10, wherein the one or more indications further indicate at least one medium access period of the one or more medium access periods for which measurements are prohibited, the method further comprising: refraining from monitoring for the communications over the at least one medium access period in accordance with the indication.

Clause 12: The method of any of clauses 8 through 11, wherein the one or more indications of the one or more respective measurement windows are received in accordance with a periodicity.

Clause 13: The method of any of clauses 8 through 12, further comprising: receiving one or more respective sounding frames from the fourth wireless communication device or the second wireless communication device over each of the one or more respective measurement windows; and transmitting, for each of the one or more respective measurement windows in response to the one or more respective sounding frames, one or more respective sounding feedback messages over the one or more respective measurement windows.

Clause 14: The method of any of clauses 8 through 13, further comprising: receiving one or more respective messages each comprising a respective BSRP trigger from the fourth wireless communication device or the second wireless communication device over each of the one or more respective measurement windows; and transmitting, for each of the one or more respective measurement windows in response to each respective BSRP trigger, one or more respective buffer status reports over the one or more respective measurement windows.

Clause 15: The method of clause 14, wherein each respective BSRP trigger, or each of the one or more respective buffer status reports, or a combination thereof, indicates one or more transmission parameters.

Clause 16: The method of any of clauses 8 through 15, wherein the one or more indications of the one or more respective measurement windows for the one or more medium access periods are received via one or more broadcast messages, one or more groupcast messages, one or more unicast messages, or any combination thereof.

Clause 17: The method of any of clauses 1 through 16, wherein the one or more attributes associated with the communications over the one or more medium access periods comprises an indication that the first wireless communication device detected the communications over the one or more medium access periods while monitoring for the communications, the one or more attributes comprising an indication of an OBSS associated with the communications.

Clause 18: The method of clause 17, wherein the report indicates a range of received signal strength indicators associated with each of the one or more medium access periods for the OBSS.

Clause 19: The method of any of clauses 17 through 18, wherein the report indicates a BSS color or BSS identifier associated with the OBSS.

Clause 20: The method of any of clauses 17 through 19, wherein the report comprises an unsolicited report from the first wireless communication device.

Clause 21: The method of any of clauses 17 through 20, further comprising: receiving a request message that indicates at least one medium access period of the one or more medium access periods for measuring the communications between the second wireless communication device and the one or more third wireless communication devices, wherein transmitting the report is in response to the request message.

Clause 22: The method of any of clauses 1 through 21, further comprising: receiving, from the fourth wireless communication device, an indication to communicate with the fourth wireless communication device over a set of medium access periods that overlap with at least one of the one or more medium access periods; and transmitting one or more uplink messages to the fourth wireless communication device in accordance with the indication to communicate with the fourth wireless communication device.

Clause 23: The method of clause 22, wherein the indication to communicate with the fourth wireless communication device indicates an uplink transmission duration, an uplink transmission bandwidth, an uplink transmission power, or any combination thereof, for communicating with the fourth wireless communication device over the set of medium access periods that overlap with at least one of the one or more medium access periods.

Clause 24: The method of any of clauses 1 through 23, wherein the one or more attributes associated with the communications over the one or more medium access periods is transmitted via an event report frame.

Clause 25: The method of any of clauses 1 through 24, wherein the one or more attributes associated with the communications over the one or more medium access periods is transmitted via a header of a medium access control layer or a physical layer, or both.

Clause 26: The method of any of clauses 1 through 25, wherein the first wireless communication device is a station, the second wireless communication device is a neighboring access point, the one or more third wireless communication devices are one or more stations, and the fourth wireless communication device is an access point currently servicing the first wireless communication device.

Clause 27: A method for wireless communications by a fourth wireless communication device, comprising: receiving, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second BSS different than a first BSS with which the first wireless communication device is associated, and the one or more medium access periods being configured for medium access and resource reservation for communications between the second wireless communication device and the one or more third wireless communication devices.

Clause 28: The method of clause 27, wherein the one or more attributes associated with the communications over the one or more medium access periods comprises an indication that the first wireless communication device detected an absence of the communications over the one or more medium access periods while monitoring for the communications.

Clause 29: The method of clause 28, wherein the report is unsolicited by the fourth wireless communication device, and the absence of the communications is indicated for at least one medium access period of the one or more medium access periods.

Clause 30: The method of any of clauses 27 through 29, further comprising: transmitting a request message that indicates at least one medium access period of the one or more medium access periods for measuring the communications between the second wireless communication device and the one or more third wireless communication devices, wherein the report is received in response to the request message.

Clause 31: The method of clause 30, wherein the request message indicates a BSS identifier or a BSS color of associated with the second BSS that is associated with the at least one medium access period.

Clause 32: The method of any of clauses 30 through 31, wherein the request message indicates each medium access period of the one or more medium access periods.

Clause 33: The method of any of clauses 30 through 32, wherein is transmitted by the fourth wireless communication device via unicast or groupcast.

Clause 34: The method of any of clauses 27 through 33, further comprising: transmitting one or more indications of one or more respective measurement windows for the one or more medium access periods, respectively, wherein the monitoring for the signaling communicated between the second wireless communication device and the one or more third wireless communication devices is in accordance with the one or more respective measurement windows.

Clause 35: The method of clause 34, wherein the one or more indications further indicate at least one medium access period of the one or more medium access periods for which measurements are prohibited by the first wireless communication device.

Clause 36: The method of any of clauses 34 through 35, wherein the one or more indications of the one or more respective measurement windows are received in accordance with a periodicity.

Clause 37: The method of any of clauses 34 through 36, further comprising: transmitting one or more respective sounding frames to the first wireless communication device over each of the one or more respective measurement windows; and receiving, for each of the one or more respective measurement windows in response to the one or more respective sounding frames, one or more respective sounding feedback messages over the one or more respective measurement windows.

Clause 38: The method of any of clauses 34 through 37, further comprising: transmitting one or more respective messages each comprising a respective BSRP trigger to the first wireless communication device over each of the one or more respective measurement windows; and receiving, for each of the one or more respective measurement windows in response to each respective BSRP trigger, one or more respective buffer status reports over the one or more respective measurement windows.

Clause 39: The method of clause 38, wherein each respective BSRP trigger, or each of the one or more respective buffer status reports, or a combination thereof, indicates one or more transmission parameters.

Clause 40: The method of any of clauses 34 through 39, wherein the one or more indications of the one or more respective measurement windows for the one or more medium access periods are transmitted via one or more broadcast messages, one or more groupcast messages, one or more unicast messages, or any combination thereof.

Clause 41: The method of any of clauses 27 through 40, wherein the one or more attributes associated with the communications over the one or more medium access periods comprises an indication that the first wireless communication device detected the communications over the one or more medium access periods while monitoring for the communications, the one or more attributes comprising an indication of an OBSS associated with the communications.

Clause 42: The method of clause 41, wherein the report indicates a range of received signal strength indicators associated with each of the one or more medium access periods for the OBSS.

Clause 43: The method of any of clauses 41 through 42, wherein the report indicates a BSS color or BSS identifier associated with the OBSS.

Clause 44: The method of any of clauses 41 through 43, wherein the report comprises an unsolicited report from the first wireless communication device.

Clause 45: The method of any of clauses 41 through 44, further comprising: transmitting a request message that indicates at least one medium access period of the one or more medium access periods for measuring the communications communicated between the second wireless communication device and the one or more third wireless communication devices, wherein receiving the report is in response to the request message.

Clause 46: The method of any of clauses 27 through 45, further comprising: transmitting, to the first wireless communication device, an indication to communicate with the fourth wireless communication device over a set of medium access periods that overlap with at least one of the one or more medium access periods; and receiving one or more uplink messages from the first wireless communication device in accordance with the indication to communicate with the fourth wireless communication device.

Clause 47: The method of clause 46, wherein the indication to communicate with the fourth wireless communication device indicates an uplink transmission duration, an uplink transmission bandwidth, an uplink transmission power, or any combination thereof, for communicating with the fourth wireless communication device over the set of medium access periods that overlap with at least one of the one or more medium access periods.

Clause 48: The method of any of clauses 27 through 47, wherein the report is received as an event report frame comprising the one or more attributes associated with the first wireless communication device monitoring over the one or more medium access periods.

Clause 49: The method of any of clauses 27 through 48, wherein the one or more attributes associated with the first wireless communication device monitoring over the one or more medium access periods is received via a header of a medium access control layer or a physical layer, or both.

Clause 50: The method of any of clauses 27 through 49, wherein the first wireless communication device is a station, the second wireless communication device is a neighboring access point, the one or more third wireless communication devices are one or more stations, and the fourth wireless communication device is an access point currently servicing the first wireless communication device.

Clause 51: A first wireless communication device for wireless communications, comprising a processing system that includes processor circuitry and memory circuitry that stores code, the processing system configured to cause the first wireless communication device to perform a method of any of clauses 1 through 26.

Clause 52: A first wireless communication device for wireless communications, comprising at least one means for performing a method of any of clauses 1 through 26.

Clause 53: A non-transitory computer-readable medium storing code for wireless communications, the code comprising instructions executable by a processor to perform a method of any of clauses 1 through 26.

Clause 54: A fourth wireless communication device for wireless communications, comprising a processing system that includes processor circuitry and memory circuitry that stores code, the processing system configured to cause the fourth wireless communication device to perform a method of any of clauses 27 through 50.

Clause 55: A fourth wireless communication device for wireless communications, comprising at least one means for performing a method of any of clauses 27 through 50.

Clause 56: A non-transitory computer-readable medium storing code for wireless communications, the code comprising instructions executable by a processor to perform a method of any of clauses 27 through 50.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can, in some examples, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless communication device, comprising:
a processing system that includes processor circuitry and memory circuitry that stores code, the processing system configured to cause the first wireless communication device to:
monitor, over one or more medium access periods, for communications between a second wireless communication device and one or more third wireless communication devices, the second wireless communication device and the one or more third wireless communication devices being associated with a second basic service set different than a first basic service set with which the first wireless communication device is associated, and the one or more medium access periods being restricted to medium access and resource reservation for communications between the second wireless communication device and the one or more third wireless communication devices in accordance with a restricted target wake time service period; and
transmit, to a fourth wireless communication device associated with the first basic service set, a report indicating one or more attributes associated with the communications over the one or more medium access periods.

2. The first wireless communication device of claim 1, wherein the one or more attributes associated with the communications over the one or more medium access periods comprises an indication that the first wireless communication device detected an absence of the communications over the one or more medium access periods while monitoring for the communications.

3. The first wireless communication device of claim 2, wherein the report is unsolicited by the fourth wireless communication device, and the absence of the communications is indicated for at least one medium access period of the one or more medium access periods.

4. The first wireless communication device of claim 1, wherein the processing system is further configured to cause the first wireless communication device to:

receive a request message that indicates at least one medium access period of the one or more medium access periods for measuring the communications between the second wireless communication device and the one or more third wireless communication devices, wherein the report is transmitted in response to the request message.

5. The first wireless communication device of claim 4, wherein the request message indicates a basic service set identifier or a basic service set color associated with the second basic service set that is associated with the at least one medium access period.

6. The first wireless communication device of claim 4, wherein the request message indicates each medium access period of the one or more medium access periods.

7. The first wireless communication device of claim 4, wherein the request message is received from the fourth wireless communication device or the second wireless communication device via unicast or groupcast.

8. The first wireless communication device of claim 1, wherein the processing system is further configured to cause the first wireless communication device to:

receive one or more indications of one or more respective measurement windows for the one or more medium access periods, respectively, wherein the monitoring for the communications between the second wireless communication device and the one or more third wireless communication devices is in accordance with the one or more respective measurement windows.

9. The first wireless communication device of claim 8, wherein the one or more indications of the one or more respective measurement windows are received from the fourth wireless communication device.

10. The first wireless communication device of claim 8, wherein the one or more indications of the one or more respective measurement windows are received from the second wireless communication device.

11. The first wireless communication device of claim 8, wherein each of the one or more indications further indicate at least one medium access period of the one or more medium access periods for which measurements are prohibited, and the processing system is further configured to cause the first wireless communication device to:

refrain from monitoring for the communications over the at least one medium access period in accordance with the indication.

12. The first wireless communication device of claim 8, wherein the one or more indications of the one or more respective measurement windows are received in accordance with a periodicity.

13. The first wireless communication device of claim 8, wherein the processing system is further configured to cause the first wireless communication device to:

receive one or more respective sounding frames from the fourth wireless communication device or the second wireless communication device over each of the one or more respective measurement windows; and transmit, for each of the one or more respective measurement windows in response to the one or more respective sounding frames, one or more respective sounding feedback messages over the one or more respective measurement windows.

14. The first wireless communication device of claim 8, wherein the processing system is further configured to cause the first wireless communication device to:

receive one or more respective messages each comprising a respective buffer status report poll (BSRP) trigger from the fourth wireless communication device or the second wireless communication device over each of the one or more respective measurement windows; and transmit, for each of the one or more respective measurement windows in response to each respective BSRP trigger, one or more respective buffer status reports over the one or more respective measurement windows.

15. The first wireless communication device of claim 14, wherein each respective BSRP trigger, or each of the one or more respective buffer status reports, or a combination thereof, indicates one or more transmission parameters.

16. The first wireless communication device of claim 8, wherein the one or more indications of the one or more respective measurement windows for the one or more medium access periods are received via one or more broadcast messages, one or more groupcast messages, one or more unicast messages, or any combination thereof.

17. The first wireless communication device of claim 1, wherein the one or more attributes associated with the communications over the one or more medium access periods comprises an indication that the first wireless communication device detected the communications over the one or more medium access periods while monitoring for the communications, the one or more attributes comprising an indication of an overlapping basic service set associated with the communications.

18. The first wireless communication device of claim 17, wherein the report indicates a range of received signal strength indicators associated with each of the one or more medium access periods for the overlapping basic service set.

19. The first wireless communication device of claim 17, wherein the report indicates a basic service set color or basic service set identifier associated with the overlapping basic service set.

20. The first wireless communication device of claim 17, wherein the report comprises an unsolicited report from the first wireless communication device.

21. The first wireless communication device of claim 17, wherein the processing system is further configured to cause the first wireless communication device to:

receive a request message that indicates at least one medium access period of the one or more medium access periods for measuring the communications between the second wireless communication device and the one or more third wireless communication devices, wherein transmitting the report is in response to the request message.

22. The first wireless communication device of claim 1, wherein the processing system is further configured to cause the first wireless communication device to:

receive, from the fourth wireless communication device, an indication to communicate with the fourth wireless communication device over a set of medium access periods that overlap with at least one of the one or more medium access periods; and transmit one or more uplink messages to the fourth wireless communication device in accordance with the indication to communicate with the fourth wireless communication device.

23. The first wireless communication device of claim 22, wherein the indication to communicate with the fourth wireless communication device indicates an uplink transmission duration, an uplink transmission bandwidth, an uplink transmission power, or any combination thereof, for communicating with the fourth wireless communication device over the set of medium access periods that overlap with at least one of the one or more medium access periods.

24. The first wireless communication device of claim 1, wherein the one or more attributes associated with the communications over the one or more medium access periods is transmitted via an event report frame.

25. The first wireless communication device of claim 1, wherein the one or more attributes associated with the communications over the one or more medium access periods is transmitted via a header of a medium access control layer or a physical layer, or both.

26. The first wireless communication device of claim 1, wherein the first wireless communication device is a station, the second wireless communication device is a neighboring access point, the one or more third wireless communication devices are one or more stations, and the fourth wireless communication device is an access point currently servicing the first wireless communication device.

27. A fourth wireless communication device, comprising:
a processing system that includes processor circuitry and memory circuitry that stores code, the processing system configured to cause the fourth wireless communication device to:
receive, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second basic service set different than a first basic service set with which the first wireless communication device is associated, and the one or more medium access periods being restricted to medium access and resource reservation for communications between the second wireless communication device and the one or more third wireless communication devices in accordance with a restricted target wake time service period.

28. The fourth wireless communication device of claim 27, wherein the one or more attributes associated with the communications over the one or more medium access periods comprises an indication that the first wireless communication device detected an absence of the communications over the one or more medium access periods while monitoring for the communications.

29. A method for wireless communications by a first wireless communication device, comprising:
monitoring, over one or more medium access periods, for communications between a second wireless communication device and one or more third wireless communication devices, the second wireless communication device and the one or more third wireless communication devices being associated with a second basic service set different than a first basic service set with which the first wireless communication device is associated, and the one or more medium access periods being restricted to medium access and resource reservation for communications between the second wireless communication device and the one or more third wireless communication devices in accordance with a restricted target wake time service period; and
transmitting, to a fourth wireless communication device associated with the first basic service set, a report indicating one or more attributes associated with the communications over the one or more medium access periods.

30. A method for wireless communications by a fourth wireless communication device, comprising:
receiving, from a first wireless communication device in association with the fourth wireless communication device, a report indicating one or more attributes associated with monitoring by the first wireless communication device for communications over one or more medium access periods between a second wireless communication device and one or more third wireless communication devices, the second wireless communication device and the one or more third wireless communication devices being associated with a second basic service set different than a first basic service set with which the first wireless communication device is associated, and the one or more medium access periods being restricted to medium access and resource reservation for communications between the second wireless communication device and the one or more third wireless communication devices in accordance with a restricted target wake time service period.

* * * * *